(12) United States Patent
Mizuno et al.

(10) Patent No.: US 10,379,930 B2
(45) Date of Patent: Aug. 13, 2019

(54) NON-TRANSITORY COMPUTER-READABLE MEDIUM STORING COMPUTER-READABLE INSTRUCTIONS FOR TERMINAL DEVICE

(71) Applicant: BROTHER KOGYO KABUSHIKI KAISHA, Nagoya-shi, Aichi-ken (JP)

(72) Inventors: Kodai Mizuno, Hekinan (JP); Hirotaka Kubota, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 128 days.

(21) Appl. No.: 15/715,721

(22) Filed: Sep. 26, 2017

(65) Prior Publication Data

US 2018/0095992 A1 Apr. 5, 2018

(30) Foreign Application Priority Data

Sep. 30, 2016 (JP) .................................. 2016-194121
Sep. 30, 2016 (JP) .................................. 2016-194133

(51) Int. Cl.
*G06F 11/07* (2006.01)
*G06F 16/182* (2019.01)

(52) U.S. Cl.
CPC ...... *G06F 11/0769* (2013.01); *G06F 11/0733* (2013.01); *G06F 11/0784* (2013.01); *G06F 16/183* (2019.01)

(58) Field of Classification Search
CPC ............. G06F 11/0769; G06F 11/0775; G06F 11/324; G06F 11/327; G06F 11/328
USPC .......................................................... 714/57
See application file for complete search history.

(56) References Cited

U.S. PATENT DOCUMENTS

| | | | | |
|---|---|---|---|---|
| 6,564,342 B2* | 5/2003 | Landan | ................. | G06F 11/323 709/224 |
| 7,660,886 B2* | 2/2010 | Abdelhadi | ............ | G06F 11/328 709/224 |
| 7,814,191 B2* | 10/2010 | Komlenic | ............... | H04L 43/16 709/223 |

FOREIGN PATENT DOCUMENTS

| | | |
|---|---|---|
| JP | 2011-258001 A | 12/2011 |
| JP | 2012-185615 A | 9/2012 |

* cited by examiner

*Primary Examiner* — Joseph R Kudirka
(74) *Attorney, Agent, or Firm* — Merchant & Gould P.C.

(57) ABSTRACT

A terminal device may send first setting information to a plurality of devices as destinations, specify M success devices and N failure devices from among the plurality of devices, and display a device screen including a plurality of device information including M success device information and N failure device information. In the device screen, each of the M success device information is displayed in an unselected form, and each of the N failure device information is displayed in a selected form. In response to accepting a change instruction, the terminal device may display a changed screen. In the changed screen, each of N1 failure device information is displayed in the unselected form, and each of N2 failure device information other than the N1 failure device information is displayed in the selected form. The terminal device may send second setting information to N2 failure devices as destinations.

20 Claims, 16 Drawing Sheets

FIG. 5
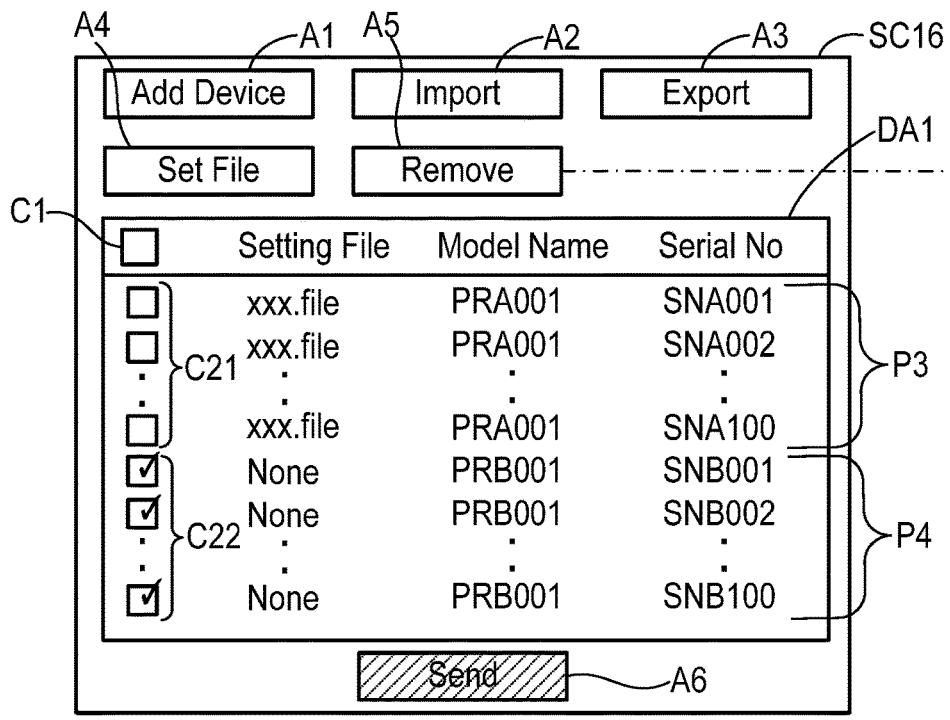
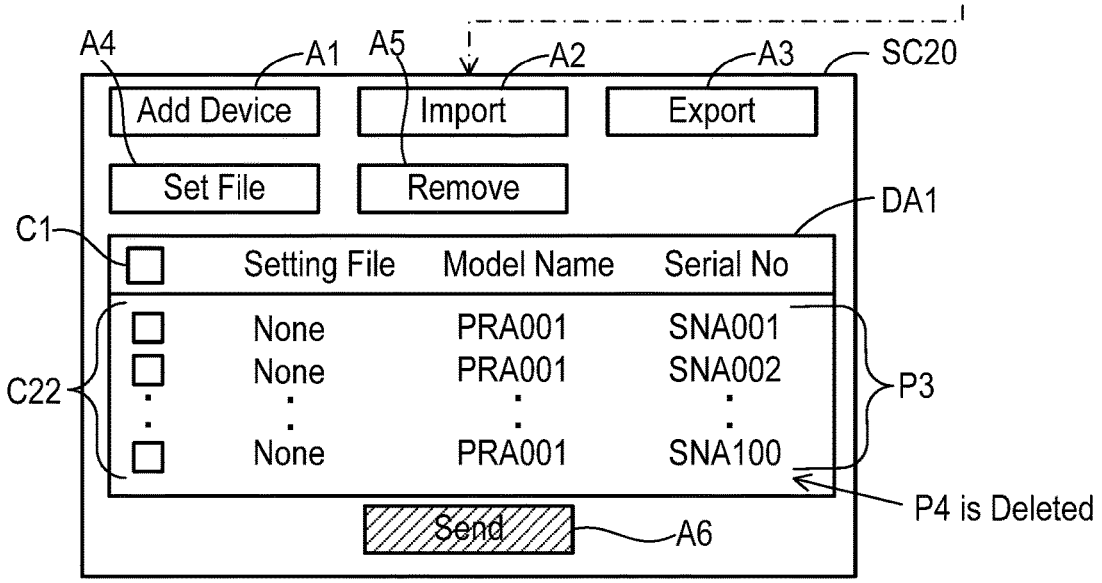

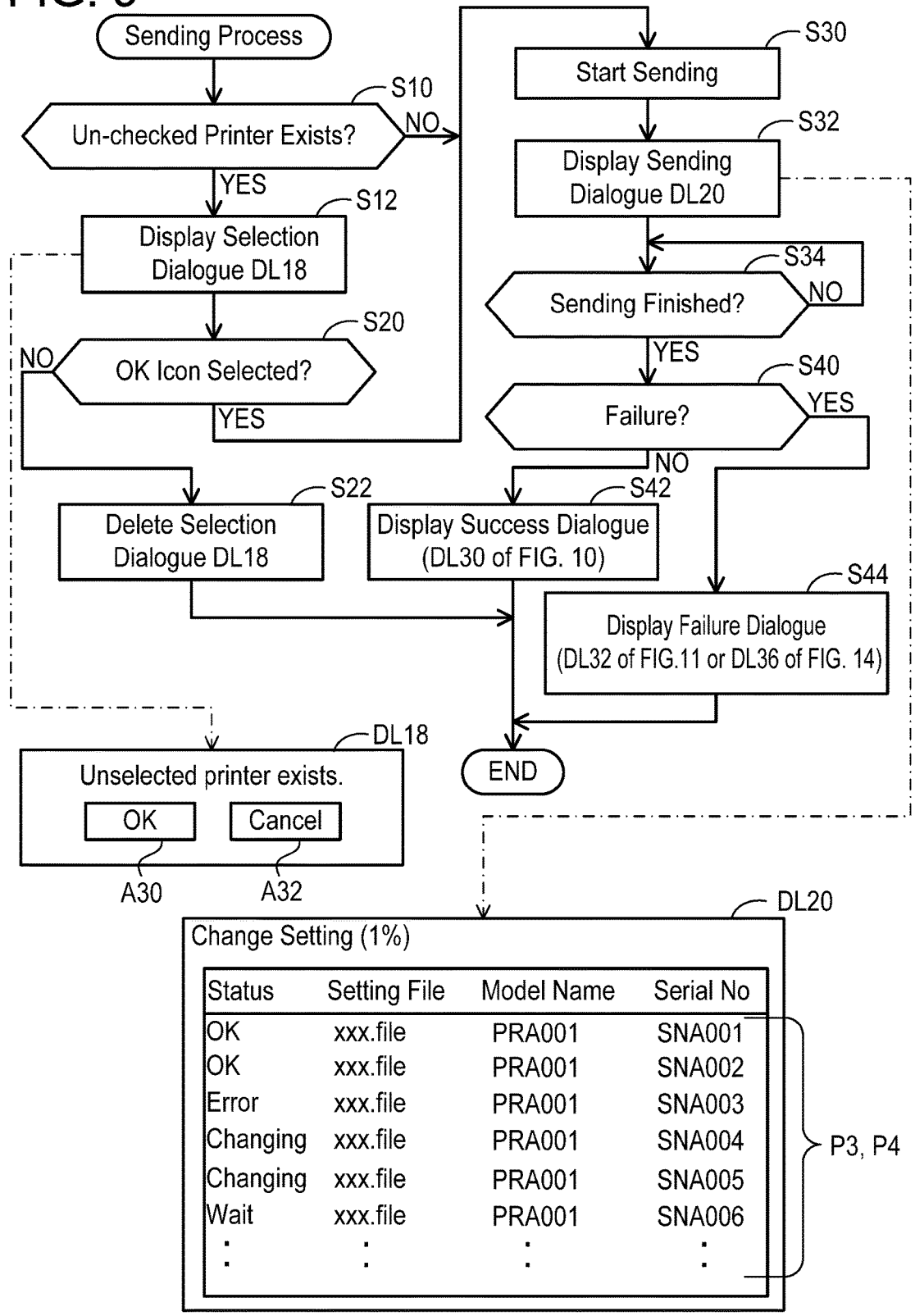

FIG. 10
(Case A)

| Successful | | | Open Log |
|---|---|---|---|
| Status | Setting File | Model Name | Serial No |
| OK | xxx.file | PRA001 | SNA001 |
| OK | xxx.file | PRA001 | SNA002 |
| OK | xxx.file | PRA001 | SNA003 |
| OK | xxx.file | PRA001 | SNA004 |
| OK | xxx.file | PRA001 | SNA005 |
| ⋮ | ⋮ | ⋮ | ⋮ |
| OK | yyy.file | PRB001 | SNB100 |

| Add Device | Import | Export |
|---|---|---|
| Set File | Remove | |

| ☐ | Setting File | Model Name | Serial No |
|---|---|---|---|
| ☐ | xxx.file | PRA001 | SNA001 |
| ☐ | xxx.file | PRA001 | SNA002 |
| ⋮ | ⋮ | ⋮ | ⋮ |
| ☐ | xxx.file | PRA001 | SNA100 |
| ☐ | yyy.file | PRB001 | SNB001 |
| ☐ | yyy.file | PRB001 | SNB002 |
| ⋮ | ⋮ | ⋮ | ⋮ |
| ☐ | yyy.file | PRB001 | SNB100 |

Send

[2016/09/14 13:42:00]
Succesful All devices (200 devices)
- xxx.file - PRA001(SNA001)
  ⋮
- yyy.file - PRB001(SNB100)

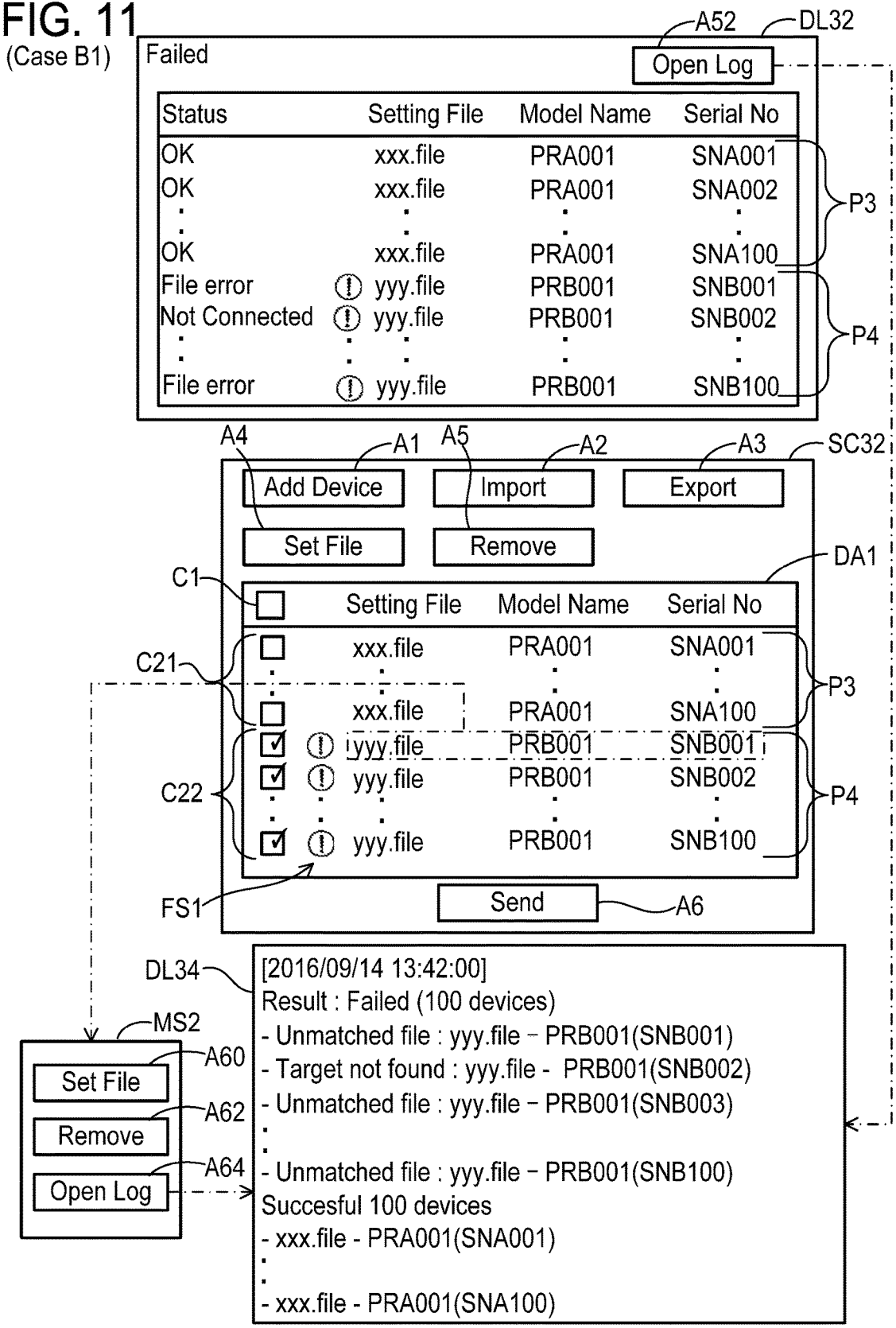
FIG. 11 (Case B1)

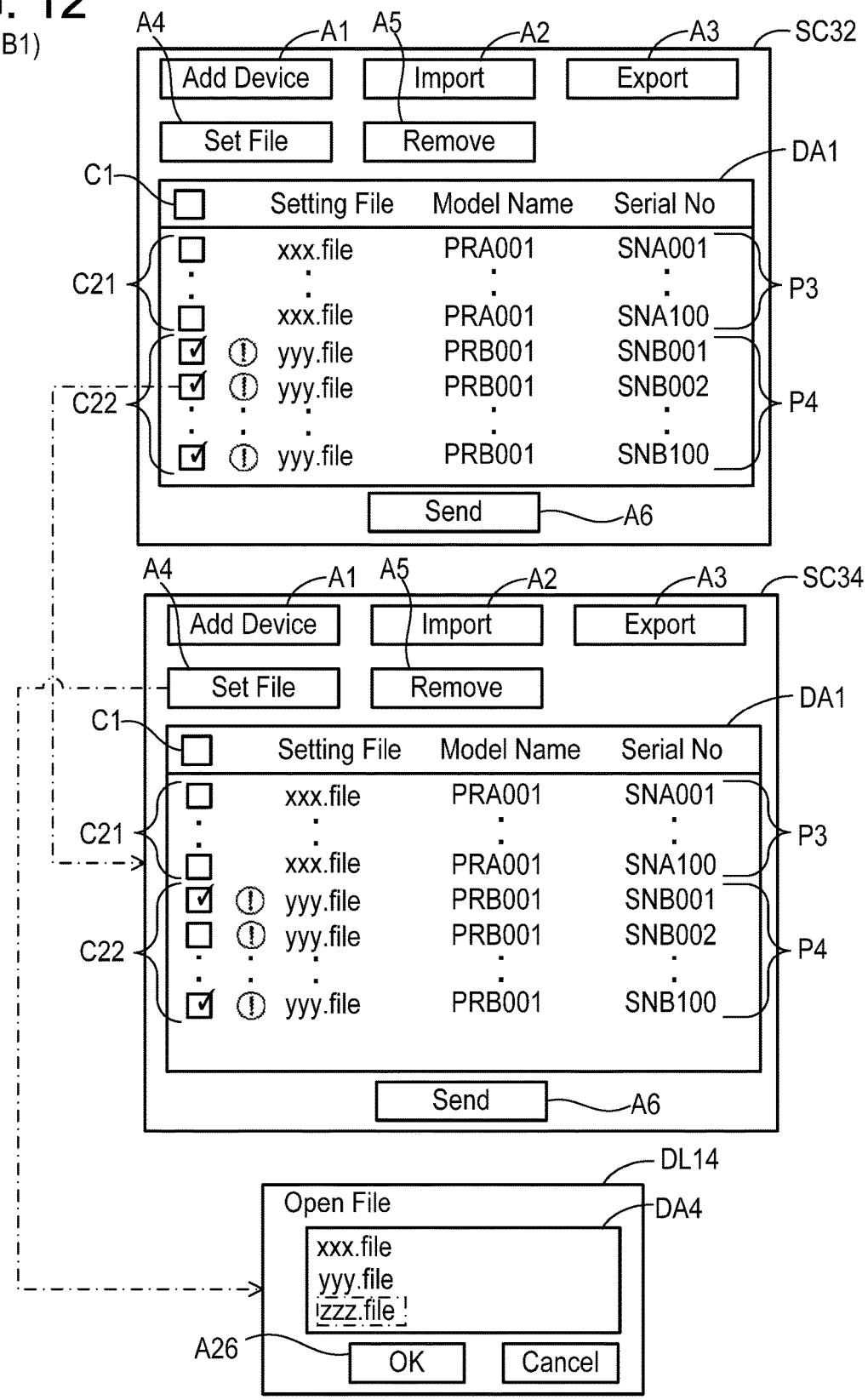
FIG. 12 (Case B1)

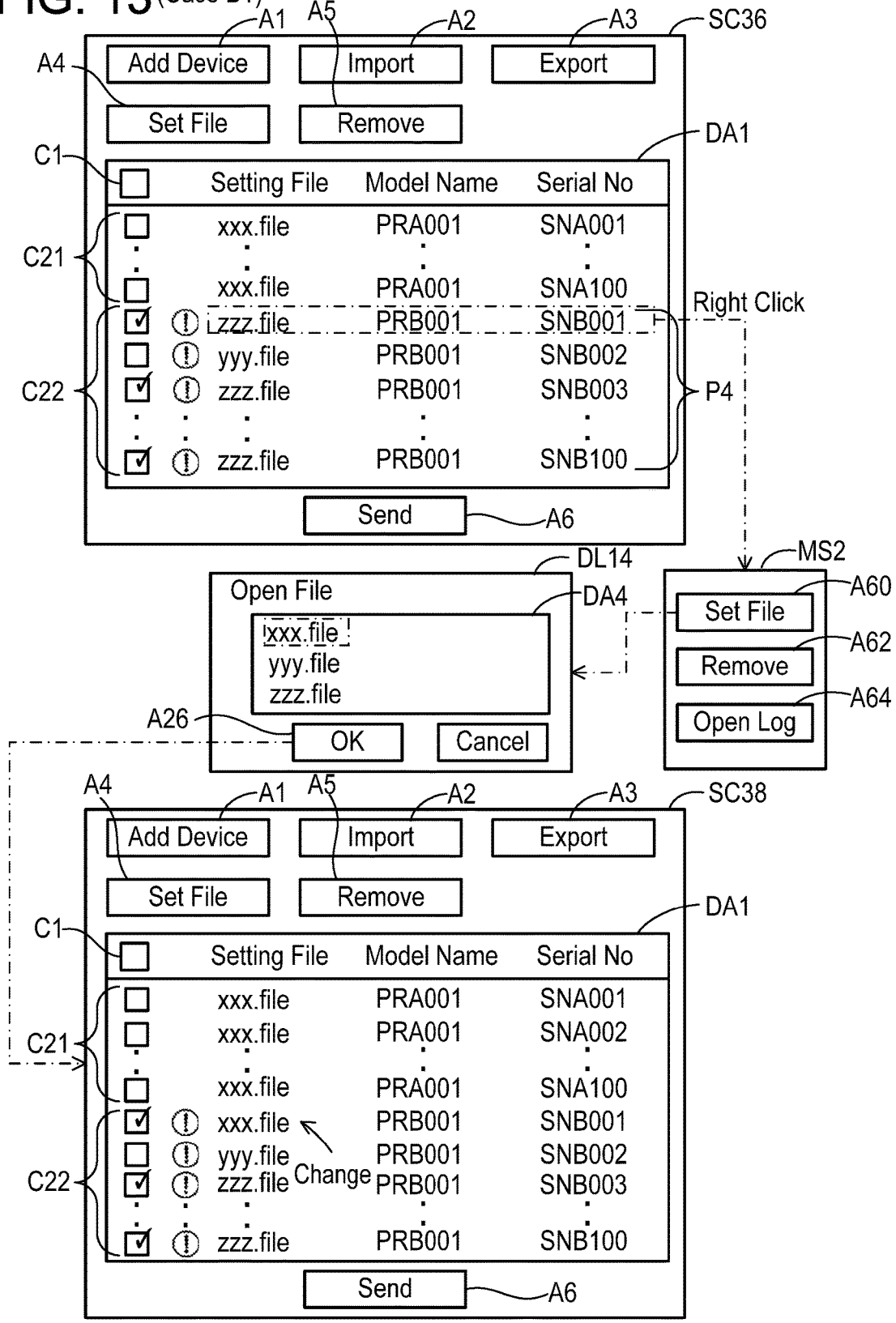
FIG. 13 (Case B1)

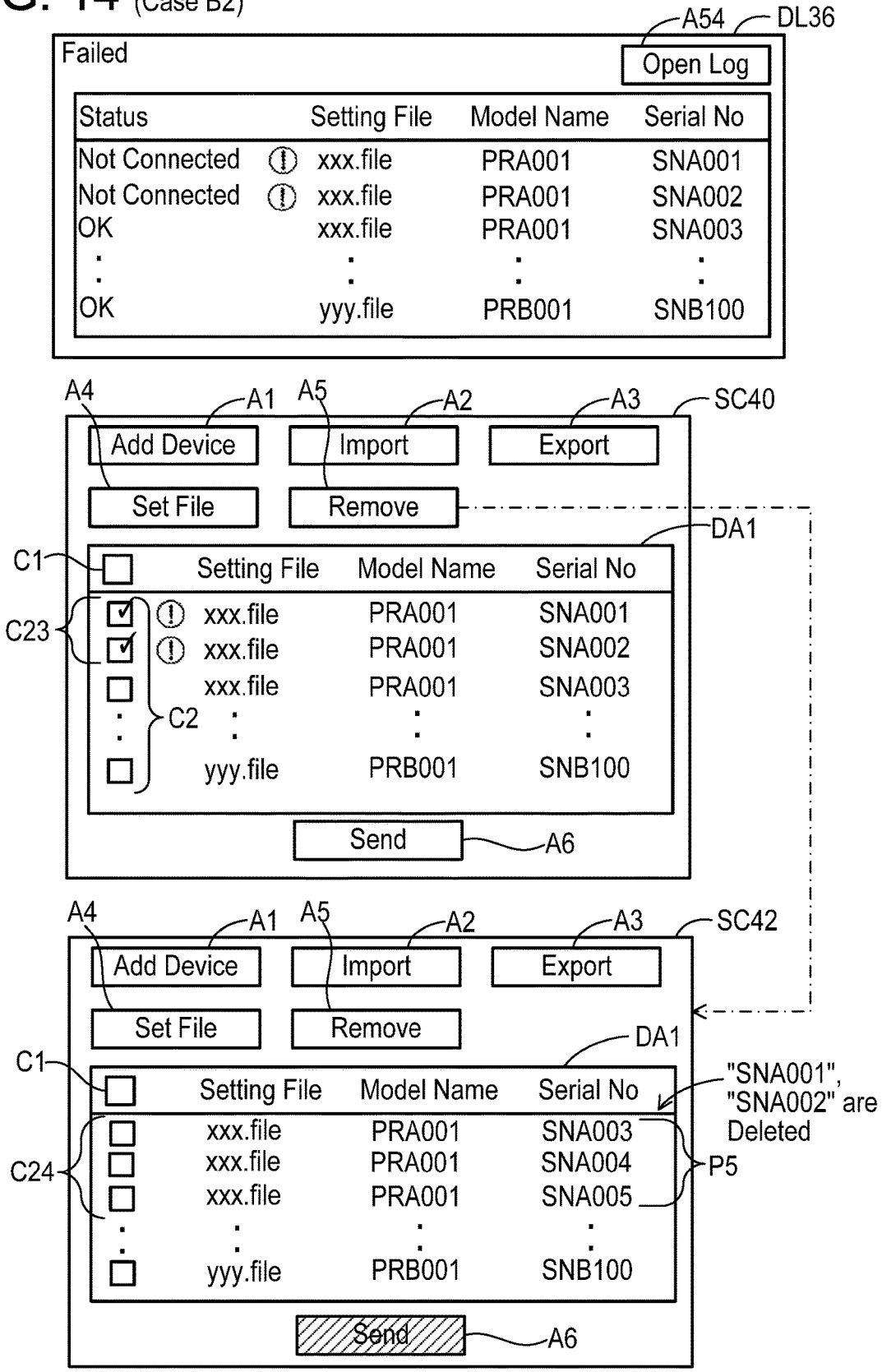
FIG. 14 (Case B2)

(Case B2)

(Case B2)

NON-TRANSITORY COMPUTER-READABLE MEDIUM STORING COMPUTER-READABLE INSTRUCTIONS FOR TERMINAL DEVICE

CROSS REFERENCE TO RELATED APPLICATIONS

This application claims priority from Japanese Patent Applications Nos. JP 2016-194121and JP 2016-194133, both filed on Sep. 30, 2016. The entire content of both priority applications are incorporated herein by reference.

TECHNICAL FIELD

The present teachings disclose an art for sending setting information to a plurality of devices.

DESCRIPTION OF RELATED ART

A communication system comprising a plurality of devices and a management device for managing the plurality of devices is known. The management device sends a setting value to each of the plurality of devices using a first format file for changing setting values of the plurality of devices. The first format file includes, for each of the plurality of devices, an attribute value for identifying the device and the setting value to be sent to the device. Thereafter, the management device generates a second format file by associating result information, which is indicative of whether the change of the setting value has succeeded or failed, with each information on the corresponding device in the first format file. When an instruction to send a setting value using the second format file is accepted from a user, the management device sends the setting value to all devices with which the result information indicating that the change of setting value has failed is associated.

SUMMARY

For example, a case may be assumed in which a user does not wish to send a setting value to some of devices in which a change of the setting value has failed. In the above mentioned technique, the user cannot manage the setting value transmission as he/she wishes because the setting value is sent to all devices in which the change of setting value has failed.

The present teachings provide an art for realizing a change to second setting information in only a part of two or more devices in which a setting change has failed.

The present teachings may disclose a non-transitory computer-readable medium storing computer-readable instructions for a terminal device, the computer-readable instructions, when executed by a processor of the terminal device, causing the terminal device to: in response to accepting a first sending instruction for instructing sending of first setting information to a plurality of devices, send the first setting information to the plurality of devices as destinations; in response to sending the first setting information to the plurality of devices as destinations, specify, from among the plurality of devices, M success devices and N failure devices, the M being an integer equal to or greater than one, the N being an integer equal to or greater than two, the N failure devices not including any of the M success devices, each of the M success devices being a device for which a change to the first setting information has succeeded, and each of the N failure devices being a device for which the change to the first setting information has failed; in response to specifying the M success devices and the N failure devices, cause a display unit of the terminal device to display a first device screen including a plurality of device information corresponding to the plurality of devices, the plurality of device information including M success device information corresponding to the M success devices and N failure device information corresponding to the N failure devices, wherein in the first device screen, each of the M success device information is displayed in an unselected form indicating that device information is not being selected, and each of the N failure device information is displayed in a selected form indicating that device information is being selected; in response to accepting a first change instruction for changing a display form of each of N1 failure device information among the N failure device information from the selected form to the unselected form after the first device screen has been displayed, cause the display unit to display a first changed screen, wherein in the first changed screen, each of the N1 failure device information is displayed in the unselected form, and each of N2 failure device information other than the N1 failure device information among the N failure device information is displayed in the selected form, the N1 being an integer equal to or greater than one and less than the N, the N2 being an integer which meets "N2=N−N1"; and in response to accepting a second sending instruction for instructing sending of second setting information under a situation where each of the N1 failure device information is displayed in the unselected form and each of the N2 failure device information is displayed in the selected form, send the second setting information to N2 failure devices corresponding to the N2 failure device information as destinations, the second setting information being not sent to N1 failure devices corresponding to the N1 failure device information even if the second sending instruction has been accepted.

The terminal device itself and a method performed by the terminal device are also novel and useful.

BRIEF DESCRIPTION OF THE DRAWINGS

FIG. 5 illustrates screens for selectively deleting one or more information;

FIG. 9 illustrates a flowchart of a sending process;

FIG. 10 illustrates screens in case A where a setting change succeeds in all printers;

FIG. 11 illustrates screens in case B1 where the setting change fails some printers;

FIG. 12 illustrates screens for deselecting one printer among the printers in which the setting change has failed, and designating a different setting file for remaining printers;

FIG. 13 illustrates screens for further designating a different setting file to the one printer;

FIG. 14 illustrates screens in case B2 where all the printer information for which a setting change has failed are deleted;

EMBODIMENT (Configuration of Communication System 2)

Figure 1:
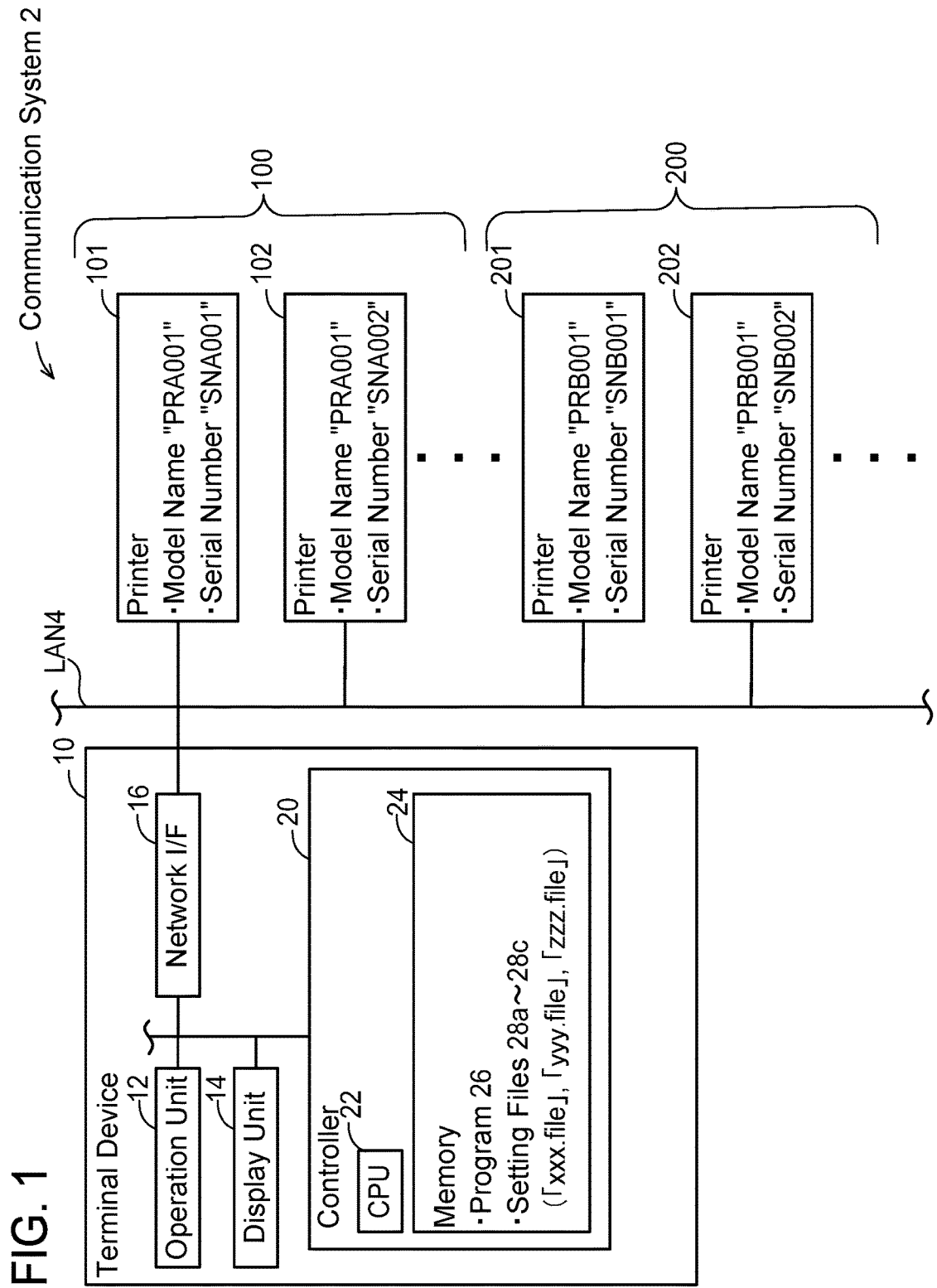
FIG. 1 illustrates a configuration of a communication system.

As shown in FIG. 1, a communication system 2 comprises a terminal device 10, a plurality of printers 100 and a plurality of printers 200. The terminal device 10 and the respective printers 100 and 200 belong to a same LAN (abbreviation of Local Area Network) 4 and capable of communicating with each other via the LAN 4. Alternatively, in a modification, at least one or more of the printers 100 and 200 may not belong to the LAN 4, but may each be connected to the terminal device 10 via a USB (abbreviation of Universal Serial Bus) cable.

Each of printers 100 and 200 is a device capable of performing a print function. The printer group 100 includes two or more printers 101 and 102 each having a model name "PRA001". The printer group 200 includes two or more printers 201, 202, each having a model name "PRB001" different from the model name "PRA001". In the present embodiment, it is assumed that each of the printer group 100 and the printer group 200 is constituted of 100 (one hundred) printers.

The printers 101 and 102 are assigned serial numbers "SNA001" and "SNA002", respectively. These serial numbers "SNA001" and the like are each a unique character string assigned to each printer by vendor(s) of the printer group 100 when the printer group 100 having the model name "PRA001" is manufactured. Similarly, the printers 201 and 202 are assigned serial numbers "SNB001" and "SNB002", respectively.

(Configuration of Terminal Device 10)

The terminal device 10 is a user terminal such as a desktop PC (abbreviation of Personal Computer), a notebook PC, and the like. The terminal device 10 comprises an operation unit 12, a display unit 14, a network interface 16, and a controller 20. Each component 12 to 20 is connected to a bus line (not denoted). Hereafter, an interface will be referred to as "I/F".

The operation unit 12 is constituted of a plurality of keys and a mouse. The user can input various instructions to the terminal device 10 by operating the operation unit 12. The display unit 14 is a display for displaying various types of information. It should be noted that the display unit 14 may function as a so-called touch panel. That is, the display unit 14 may function as an operation unit operated by the user. The network I/F 16 is an I/F for performing wired communication, and connected to the LAN 4. In a modification, the network I/F 16 may be an I/F for performing wireless communication, and in this case, the LAN 4 is a so-called wireless LAN.

The controller 20 comprises a CPU 22 and a memory 24. The CPU 22 performs various types of processing in accordance with a program 26 stored in the memory 24. The memory 24 is constituted of a volatile memory, a non-volatile memory, or the like. The memory 24 stores a plurality of setting files 28a to 28c in addition to the program 26. File names for the setting files 28a to 28c are "xxx.file", "yyy.file", and "zzz.file", respectively.

The program 26 is a program for changing setting value(s) of the printer groups 100, 200, and is supplied by the vendor(s) of the printer groups 100, 200. The terminal device 10 may for example install the program 26 from a medium shipped together with the printer group 100 or may install the program 26 from a server (not shown) on the Internet.

The respective setting files 28a, etc. are files describing plural setting values related to the print function in a predetermined format. The predetermined format is for example JSON (abbreviation of JavaScript (registered trademark) Object Notation) format, PJL (abbreviation of Printer Job Language) format, etc. The plural setting values include, for example, a value indicating a default print resolution, a value indicating whether both side printing is allowed or not, a value indicating a power saving time, a value indicating whether wireless communication with another device is allowed or not, etc. It should be noted that the power saving time is a time indicating a condition for a printer to shift from a normal state to a power saving state. That is, when a state where no instruction is accepted from the user has continued for the power saving time, the printer shifts from the normal state to the power saving state. The setting files 28a, etc. are generated in the memory 24 by the user of the terminal device 10 (i.e., an administrator of the printers 100, 200). In a modification, the setting files 28a, etc. may each be a file supplied by the vendor(s) of the printers 100, 200. In this case, the setting files 28a, etc. may be indicating a default setting recommended by the vendor(s).

(Processing for Changing Setting Value of Each Printer: FIGS. 2 to 16)

By referring to FIGS. 2 to 16 sequentially, contents of processing which is executed by the CPU 22 of the terminal device 10 in accordance with the program 26 will be described.

Figure 2:
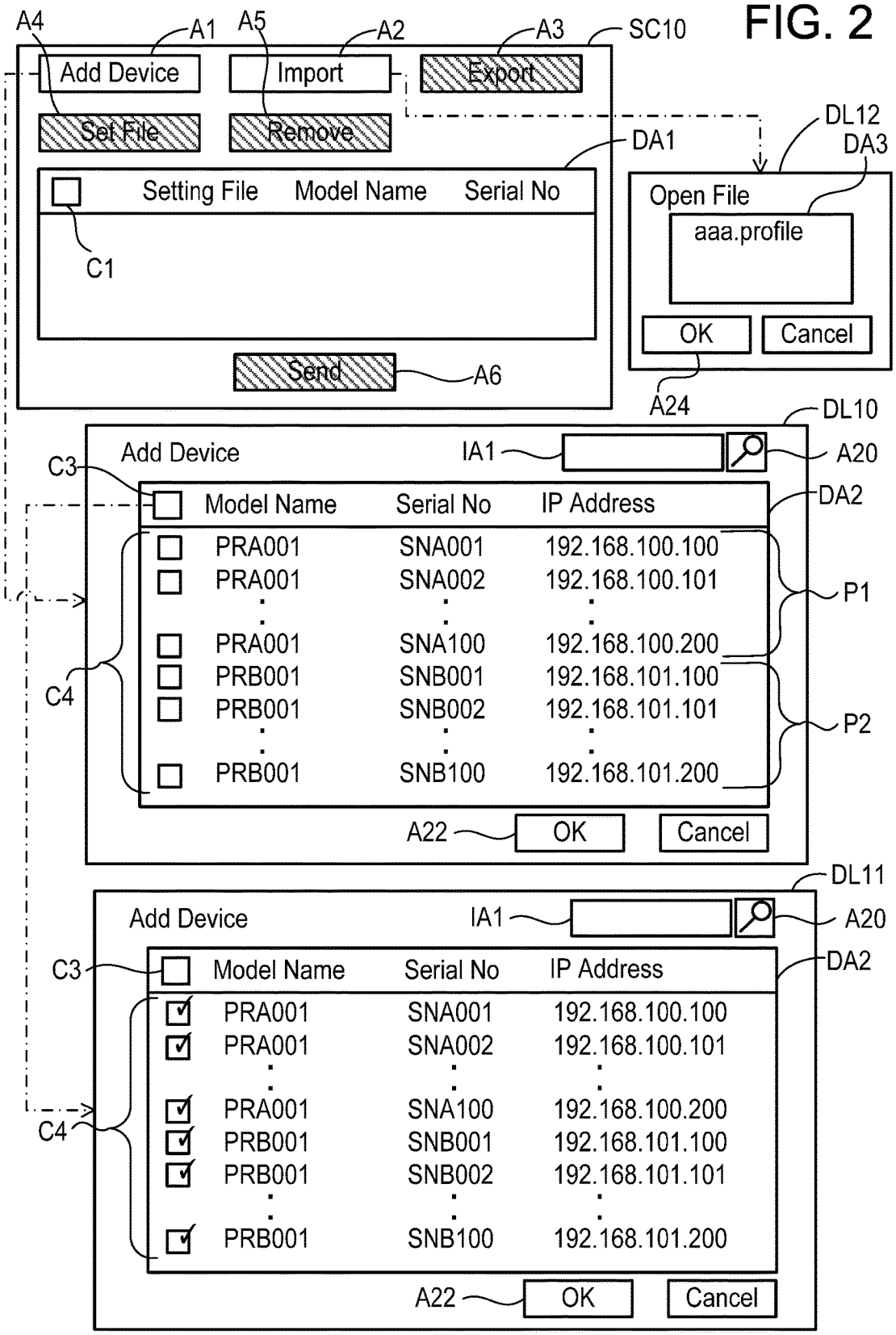
FIG. 2 illustrates an initial screen and screens representing a search result of printers.

(Initial Screen and Printer Search; FIG. 2)

The CPU 22 causes the display unit 14 to display a device screen SC10, an initial screen, in response to the user activating the program 26 by operating the terminal device 10. The device screen SC 10 comprises an add icon A1, an import icon A2, an export icon A3, a set icon A4, a remove icon A5, a send icon A6, and a printer display area DA1. Each of the icons A1 to A6 is an area for accepting an instruction via the operation unit 12. The printer display area DA1 is an area for displaying respective printer information corresponding to respective printers, and is capable of accepting instructions via the operation unit 12. In the printer display area DA1 in the device screen SC10 being the initial screen, the print information is not yet displayed.

The icons A1 and A2 in the device screen SC10 are displayed in a form (hereafter, "available form") by which an instruction that selects an icon (e.g., left click of the mouse) can be accepted. In the meantime, the icons A3 to A6 are displayed in a form (hereafter, "unavailable form") by which the instruction that selects an icon cannot be accepted. In the present embodiment, the unavailable form is depicted by a hatching, but in actuality, may be displayed in a grayed out state or any other such state.

The CPU 22 broadcasts an obtaining request to the LAN 4 via the network OF 16 in a case where the add icon A1 in the device screen SC10 is selected. The obtaining request is a request for obtaining the printer information from each printer 100, 200. The CPU 22 obtains a plurality of the printer information corresponding to the respective printers 100, 200 via the network I/F 16. Each of the printer information includes the model name, the serial number, and an IP address.

The CPU 22 causes the display unit 14 to display a dialog DL10 after the CPU 22 has obtained the printer information from each printer 100, 200. The dialog DL10 is a different screen from the device screen SC10, but is displayed synchronously (e.g., displayed in such a manner as being overlapped on the device screen SC10). The dialog DL10 includes an input area IA1, a search icon A20, a printer display area DA2, and an OK icon A22.

The printer display area DA2 includes a printer information group P1 corresponding to the printer group 100 and a printer information group P2 corresponding to the printer group 200. The printer display area DA2 further includes a select-all box C3, and a selection box group C4. In the printer display area DA2, for each of the plurality of the printer information P1, P2 (in the present embodiment, two-hundred printer information P1, P2), one of the plurality of the printer information and one box in the selection box group C4 are associated with each other. Each selection box is displayed in either of a selected form including a tick symbol and an unselected form not including the tick symbol. It should be noted that, in a modification, instead of the tick symbol, another symbol (e.g., solid black square) may be implemented. When each selection box accepts an instruction for selecting the selection box in a state where the selection box is displayed in one of the selected form or the unselected form, the selection box is changed into the other form. The select-all box C3 is an area for accepting an instruction for displaying all boxes in the selection box group C4 collectively in either of the selected form or the unselected form.

The CPU 22 first displays the dialog DL10 in which all boxes in the selection box group C4 have the unselected form on the display unit 14. When accepting an instruction for selecting the select-all box C3, the CPU 22 displays a dialog DL11 in which all the boxes in the selection box group C4 have the selected form. Thereafter, when accepting an instruction for selecting the OK icon A22 in the dialog DL11, the CPU 22 displays a device screen SC12 in FIG. 3 to replace the device screen SC10 on the display unit 14.

The search icon A20 is an icon for accepting an instruction for searching for one or more of the printer information that include a character string inputted in the input screen IA1 from among the printer information groups P1, P2. For example, in a case where a character string "PRA001" that is the model name of the printer group 100 is inputted in the input area IA1 and then the search icon A20 is selected, the CPU 22 displays, on the display unit 14, a dialog (not shown) that includes only the printer information group P1 to replace the dialog DL10. When accepting the instruction for selecting the select-all box C3 and the instruction for selecting the OK icon A22 in the dialog, the CPU 22 displays, on the display unit 14, a device screen (not shown) that includes only the printer information group P1 to replace the device screen SC10. Thus, the user can display a device screen that includes a printer information group that includes any desired character string.

Figure 3:
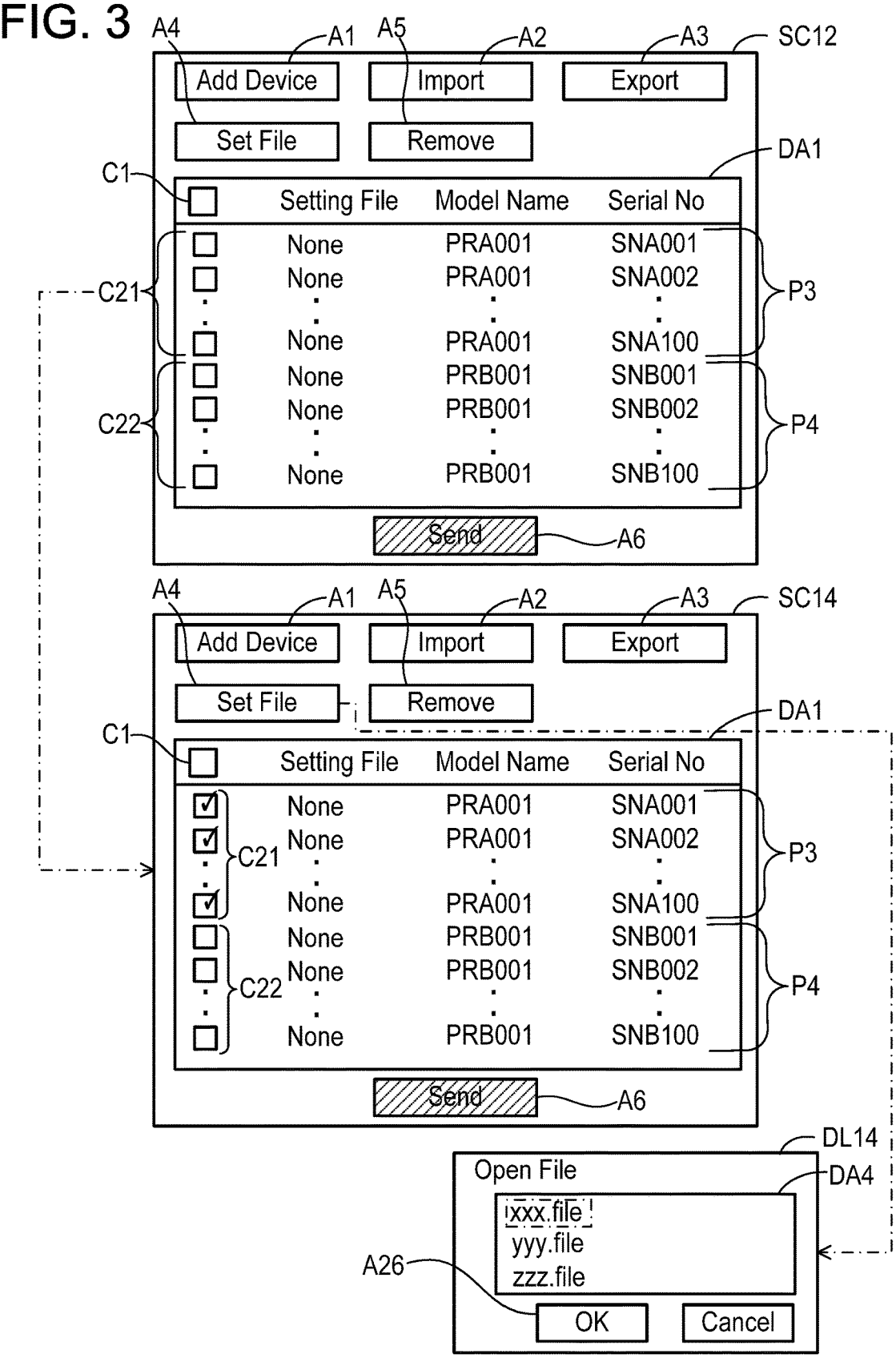
FIG. 3 illustrates screens for selectively designating a setting file for one or more printer information.
Figure 4:
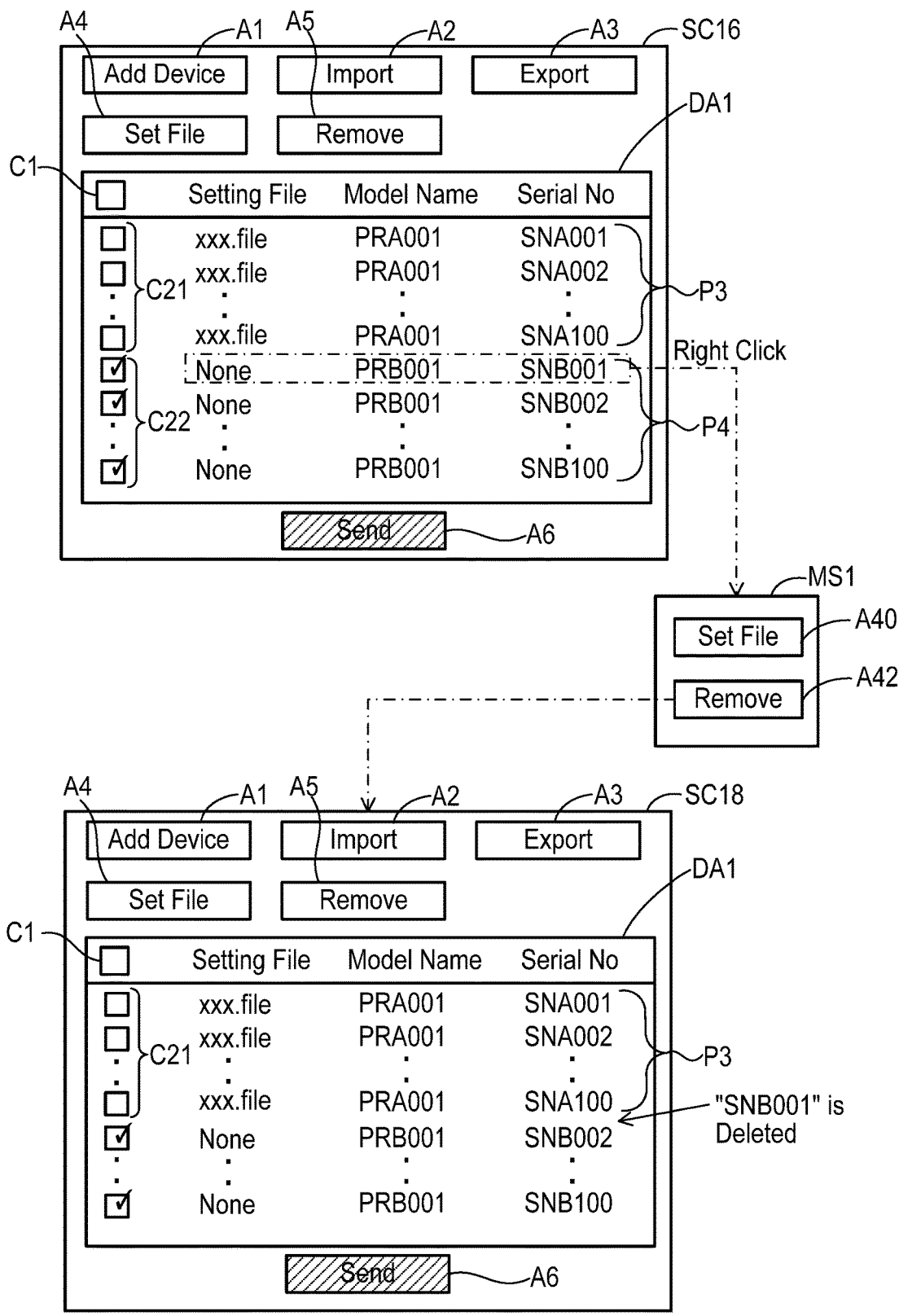
FIG. 4 illustrates screens for selectively deleting one or more information.

(Designation of Setting File for One or More of Printer Information; FIGS. 3, 4)

Similarly to the device screen SC10, the device screen SC12 in FIG. 3 includes the respective icons A1 to A6, and the printer display area DA1. The printer display area DA1 in the device screen SC12 includes a printer information group that includes the model names, the serial numbers, but does not include an IP address.

The printer display area DA1 in the device screen SC12 includes combination information groups P3, P4 in which, for each of the plurality of the printer information (two-hundred printer information in the present embodiment), the printer information, a selection box for selecting the printer information, and a character string "None" are all associated with each other. The character string "None" indicates that no setting file has been designated for that printer information.

The respective icons A1 to A5 in the device screen SC12 are displayed in the available form, and the icon A6 is displayed in the unavailable form. That is, the CPU 22 displays the respective icons A1 to A5 in the available form in a case where the printer display area DA1 includes one or more of the combination information.

When accepting an instruction for selecting all boxes in a selection box group C21 included in the combination information group P3 on the device screen SC12, the CPU 22 displays, on the display unit 14, a device screen SC14 in which all the boxes in the selection box group C21 have the selected form. Subsequently, when accepting an instruction for selecting the set icon A4 in the device screen SC14, the CPU 22 displays a dialog DL14 on the display unit 14. The dialog DL14 includes a display area DA4 including file names of the respective setting files 28a to 28c stored in the memory 24, and an OK icon A26. When accepting an instruction for designating the file name of the setting file 28a "xxx.file" and an instruction for selecting the OK icon A26, the CPU 22 displays a device screen SC16 in FIG. 4 on the display unit 14.

In the printer display area DA1 in the device screen SC16 in FIG. 4, all of the combination information group P3 include the file name of the setting file 28a "xxx.file". Further, the selection box group C21 included in the combination information group P3 is displayed in the unselected form. That is, the combination information group P3 in which the setting file 28a has been designated is displayed in the unselected form. On the other hand, a selection box group C22 included in the combination information group P4 is displayed in the selected form. That is, the combination information group P4 in which a setting file has not been yet designated is displayed in the selected form. Due to this, the user can designate a setting file in the printer information group included in the combination information group P4 even if the user does not select the selection box group C22 included in the combination information group P4. For this reason, user convenience can be improved.

(Deletion of One or More of Combination Information; FIGS. 4, 5)

Before describing a situation where a setting file is designated for the printer information group included in the combination information group P4, a process for deleting one or more of the combination information. In the device screen SC16, a deletion instruction for deleting one or more of the combination information from the printer display area DA1 can be accepted in two methods. In the first method, the CPU 22 accepts an instruction for selecting (e.g., right clicking of the mouse) one of the combination information that includes the serial number "SNB001" in the printer display area DA1. In this case, the CPU 22 displays, on the display unit 14, a menu screen MS1 to be overlapped on the device screen SC16. The menu screen MS1 includes a set icon A40 and a remove icon A42. In a case where the CPU 22 accepts an instruction for selecting the remove icon A42, the CPU 22 displays, on the display unit 14, a device screen SC18 in which the one of the printer information that includes the serial number "SNB001" has been deleted.

Thus, according to the first method, the user can selectively delete only one of plurality of the combination information corresponding to one printer.

In reference to FIG. 5, the second method will be described. In a case where the CPU 22 accepts an instruction for selecting the remove icon A5 in the device screen SC16, the CPU 22 displays, on the display unit 14, a device screen SC20 in which the combination information group P4 including the selection box group C22 having the selected form has been deleted. Thus, according to the second method, the user can delete a plurality of the combination information group P4 corresponding to plural printers at once.

Figure 6:
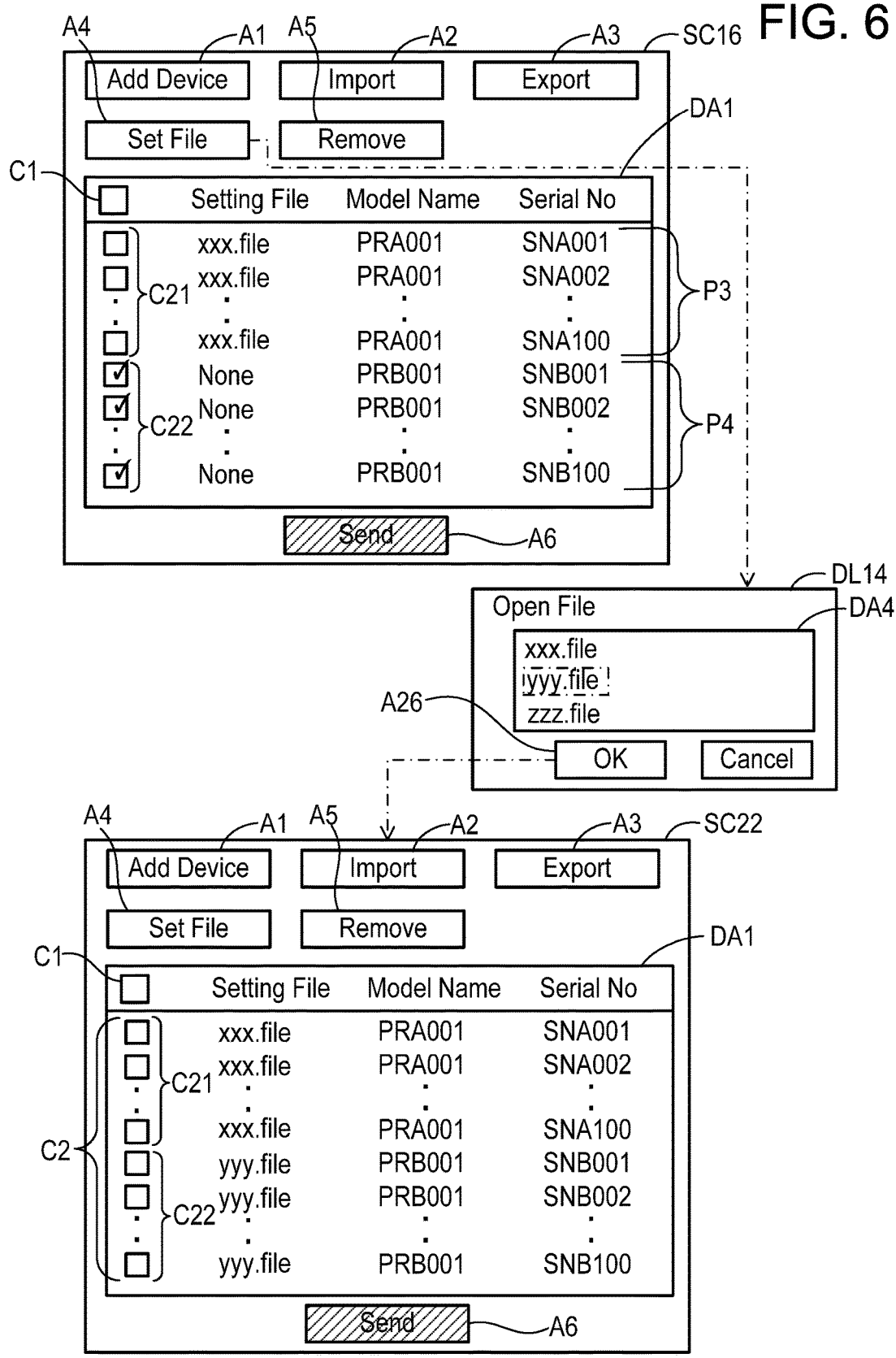
FIG. 6 illustrates screens for designating a setting file for remaining printer information.

(Designation of Setting File to Remaining Printer Information; FIG. 6)

In reference to FIG. 6, a process of designating a setting file for the printer information group included in the combination information group P4 will be described. As mentioned above, in the device screen SC16, the combination information group P3 in which the setting file 28a has been designated is displayed in the unselected form while the combination information group P4 in which a setting file has not been yet designated is displayed in the selected form. Due to this, the user can designate a setting file for the printer information group included in the combination information group P4 when the user selects the set icon A4 even if the user does not change the display forms of the selection box groups C21, C22. Thereby, user convenience can be improved. Specifically, when accepting the instruction for selecting the set icon A4 in the device screen SC16, the CPU 22 displays the dialog DL14 on the display unit 14. In a case where the CPU 22 accepts an instruction for designating the file name of the setting file 28b "yyy.file" and the instruction for selecting the OK icon A26 in the display area DA4 in the dialog DL14, the CPU 22 displays a device screen SC22 on the display unit 14. It should be noted, in a modification, that the file name of the setting file 28a "xxx.file" may be designated in the display area DA4. That is, the same setting file 28a may be designated for all the printer information included in the combination information groups P3, P4.

In the printer display area DA1 in the device screen SC22, the combination information group P3 includes the file name of the setting file 28a "xxx.file", whereas the combination information group P4 includes the file name of the setting file 28b "yyy.file". Since the setting files 28a, 28b are designated for all the printer information, all the boxes of the selection box group C2 are displayed in the unselected form.

Figure 7:
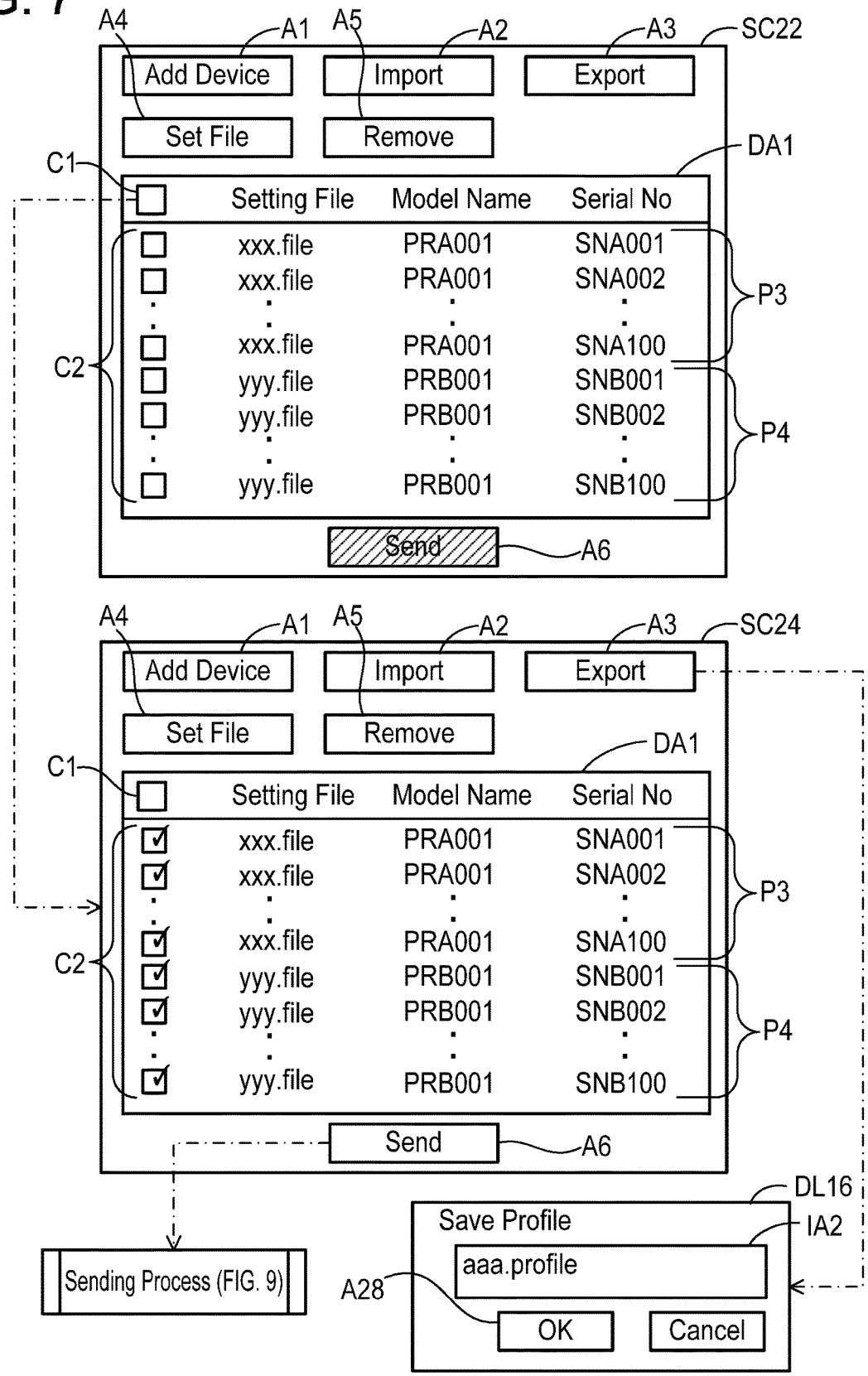
FIG. 7 illustrates screens for sending a setting file to each printer.

(Sending Setting File to Each Printer; FIG. 7)

In FIG. 7, in a case where the CPU 22 accepts an instruction for selecting a select-all box C1 in the device screen SC22, the CPU 22 displays, on the display unit 14, a device screen SC24 in which all boxes in the selection box group C2 have the selected form.

The CPU 22 displays the send icon A6 in the available form in a case where the setting file is designated for one or more printer information in the printer display area DA1, and the selection box corresponding to at least one of the one or more printer information is in the selected form. In the device screens SC12 and SC14 in FIG. 3, no setting file has been designated for any of the printer information. Due to this, the send icon A6 is displayed in the unavailable form. Further, although in the device screen SC16 in FIG. 6, the setting file 28a has been designated for the printer information group included in the combination information group P3, all boxes of the selection box group C21 included in the combination information group P3 have the unselected form. Due to this, the send icon A6 is displayed in the unavailable form. In a case where the CPU 22 accepts an instruction for selecting the send icon A6, the CPU 22 performs a sending process of FIG. 9.

(Exporting; FIG. 7)

Before describing a content of the sending process, several functions that can be realized in the device screen SC24 will be described. In a case where the CPU 22 accepts an instruction for selecting the export icon A3 in the device screen SC24, the CPU 22 displays a dialog DL16 on the display unit 14. The dialog DL16 includes an input area IA2 for inputting a profile name of profile information to be saved, and an OK icon A28.

In a case where the CPU 22 accepts an input to the input area IA2 of a profile name "aaa.profile" and an instruction for selecting the OK icon A28, the CPU 22 saves the profile information corresponding to the profile name "aaa.profile" in the memory 24. The profile information includes all the printer information in the combination information groups P3 and P4 and the file names of all the setting files that are displayed in the device screen SC24, and does not include information indicating the display forms of the selection box group C2.

A situation is assumed where, after the above profile information has been saved in the memory 24, the device screen SC10 in FIG. 2 is displayed. In this case, in a case where the CPU 22 accepts an instruction for selecting the import icon A2 in the device screen SC10, the CPU 22 displays a dialog DL12 on the display unit 14. The dialog DL12 includes a display area DA3 including the profile name "aaa.profile" of the profile information saved in the memory 24, and an OK icon A24. In a case where the CPU 22 accepts an instruction for selecting the profile name "aaa.profile" in the display area DA3 and an instruction for selecting the OK icon A24, the CPU 22 displays the device screen SC22 in FIG. 7 on the display unit 14, using the profile information saved in the memory 24. Because the profile information does not include the information indicating the display forms of the selection box group C2, the device screen SC22 including the selection box group C2 having the unselected form is displayed. Thus, the user is able to save the profile information indicating a content being currently displayed in the printer display area DA1 in the memory 24, and thereafter, to display a device screen including the content indicated by that profile information by selecting the profile information. It should be noted, in a modification, that the profile information may include the information indicating the display forms of the selection box group C2. In this case, the CPU 22 displays the device screen SC24 in which the selection box group C2 has the selected form on the display unit 14.

Figure 8:
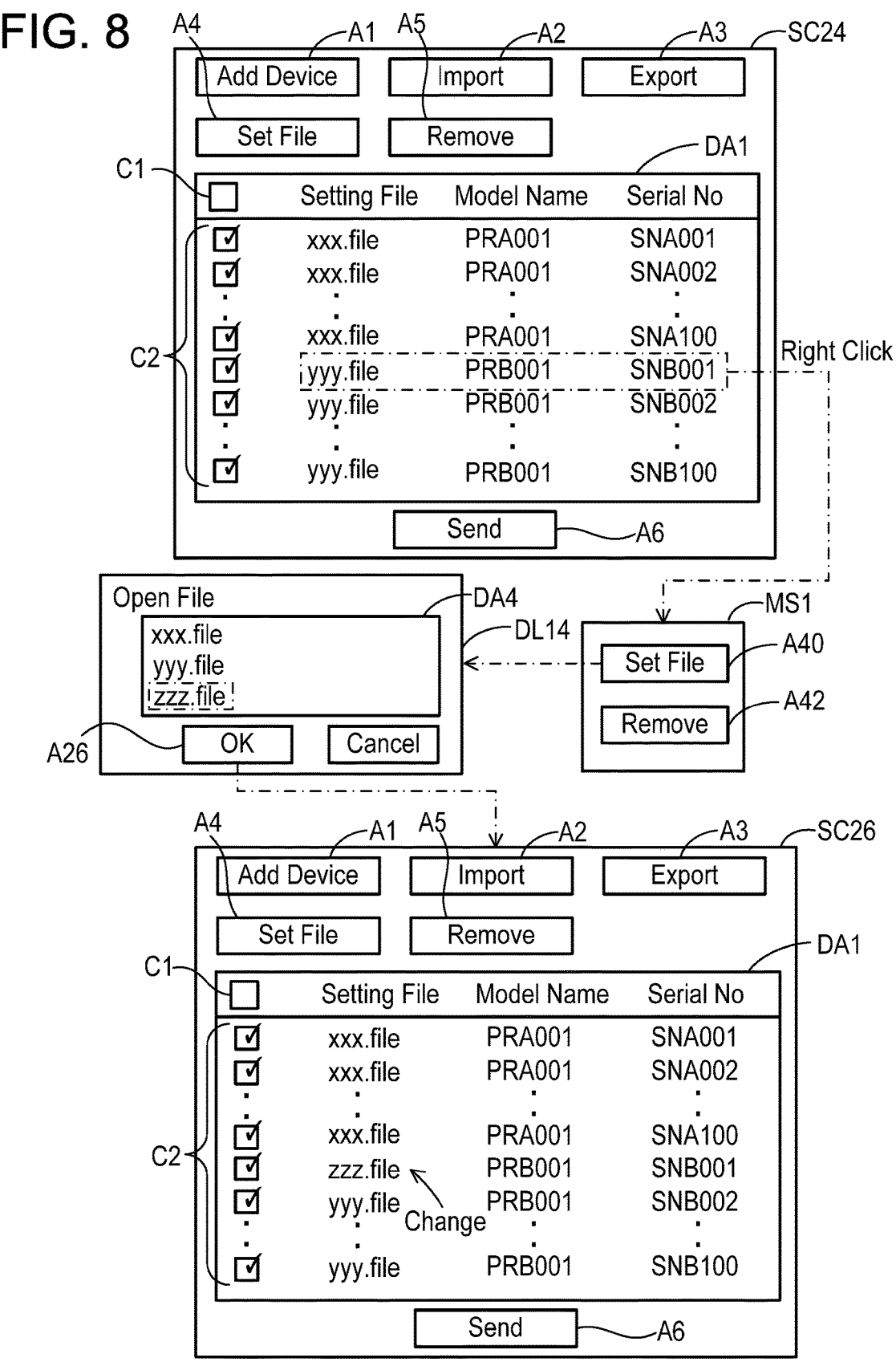
FIG. 8 illustrates screens for changing a designated setting file.

(Changing Designated Setting File; FIG. 8)

Subsequently, in reference to FIG. 8, a process of changing a setting file that has been designated will be described. In a case where the CPU 22 accepts an instruction for selecting one of the combination information including the serial number "SNB001" in the printer display area DA1, the CPU 22 displays the menu screen MS1 on the display unit 14. In a case where the CPU 22 accepts an instruction for selecting the set icon A40 in the menu screen MS1, the CPU 22 displays the dialog DL14 on the display unit 14. In a case where the CPU 22 accepts an instruction for designating the file name of the setting file 28c "zzz.file" and an instruction for selecting the OK icon A26 in the display area DA4 in the dialog DL14, the CPU 22 displays a device screen SC26 on the display unit 14. In the device screen SC26, the file name of the setting file 28c "zzz.file", instead of the file name of the setting file 28b "yyy.file", is associated with the printer information that includes the serial number "SNB001". Thus, the user is able to designate the setting file 28c, different from the designated setting file 28b, for the printer information that includes the serial number "SNB001". Further, by repeating the above instruction for all the plurality of the combination information, it is possible to designate a setting file for the plurality of the combination information. For example, instead of accepting the instruction for selecting the set icon A4 in the device screen SC14 in FIG. 3, by accepting an instruction for selecting one of the combination information including the serial number "SNA001" in the printer display area DA1 and selecting the set icon A40 in the menu screen MS1, the setting file 28a may be designated for the printer information including "SNA001". The CPU 22 displays on the display unit 14, by repeating to accept this instruction for all the combination information group P3, a device screen (not shown) in which all the combination information group P3 include the file name "xxx.file" of the setting file 28a. This device screen is the same as the device screen SC16 in FIG. 4 except the selection box group C22 has the unselected form.

(Sending Process; FIG. 9)

In reference to FIG. 9, a sending process that is initiated by a trigger of the send icon A6 being selected will be described. In S10, the CPU 22 determines whether or not the selection box group C2 in the printer display area DA1 includes one or more selection boxes having the unselected form. For example, because in the device screen SC24 in FIG. 7 all the boxes of the selection box group C2 are displayed in the selected form, the CPU 22 determines NO in S10, skips processes of S12 and S20 and proceeds to S30.

Contrary to this, for example, when, after the device screen SC24 in FIG. 7 has been displayed, an instruction for selecting one or more selection boxes of the selection box group C2 is accepted, the one or more selection boxes are displayed in the unselected form. When the send icon A6 is selected in this situation, the CPU 22 determines YES in S10 and proceeds to S12.

In S12, the CPU 22 displays a selection dialog DL18 on the display unit 14. The selection dialog DL18 includes a message indicating presence of unselected printer(s), an OK icon A30, and a cancel icon A32. This enables the user to know that the setting file(s) is not sent to one or more printers, and to select whether or not the user can allow the process to proceed as it is.

In S20, the CPU 22 determines whether or not the OK icon A30 in the selection dialog DL18 is selected. In a case where the OK icon A30 is selected, the CPU 22 determines YES in S20 and proceeds to S30. Contrary to this, in a case where the cancel icon A32 is selected, the CPU 22 determines NO in S20, deletes the selection dialog DL18 in S22, and terminates the sending process of FIG. 9.

In S30, the CPU 22 initiates sending of the setting file(s). For example, in the device screen SC24 in FIG. 7, all the boxes of the selection box group C2 have the selected form. In this case, the CPU 22 initiates both sending of the setting file 28a having the file name "xxx.file" to all the printers of the printer group 100 corresponding to the combination information group P3 and sending of the setting file 28b having the file name "yyy.file" to all the printers of the printer group 200 corresponding to the combination information group P4. Specifically, firstly, the CPU 22 specifies a group of IP addresses corresponding to the combination information group P3 (see P1 in FIG. 2), and sends the setting file 28a to respective addresses in the specified IP address group as destinations. Further, the CPU 22 specifies a group of IP addresses corresponding to the combination information group P4 (see P2 in FIG. 2), and sends the setting file 28b to respective addresses in the specified IP address group as destinations.

In S32, the CPU 22 displays a send dialog DL20 on the display unit 14. The send dialog DL20 is a screen for informing the user of a situation of sending the setting files to the printer groups 100, 200. In the send dialog DL20, the combination information groups P3, P4 further include status information. Each of the status information is one of a character string "OK", a character string "Error", a character string "Changing", and a character string "Wait".

The character string "OK" indicates that the change of a setting value in accordance with the corresponding setting file has succeeded in a printer to which the corresponding setting file was sent. Specifically, in a case where the CPU 22 accepts a success notification indicating that the change of the setting value has succeeded from the printer, the CPU 22 specifies the combination information corresponding to the printer as success information. Then, the CPU 22 displays the character string "OK" as the status information included in the success information.

The character string "Error" indicates that the change of a setting value in accordance with a setting file has failed in a printer to which the setting file was sent. Specifically, in a case where the CPU 22 does not accept the success notification from the printer, the CPU 22 specifies the combination information corresponding to the printer as failure information. The CPU 22 displays the character string "Error" as the status information included in the failure information. For example, in a situation where the printer is not connected to the LAN 4 or in a situation where a setting file which is to be sent has a form not interpretable by the program 26, the CPU 22 cannot send the setting file, and so cannot accept the success notification. In addition, in a case where the CPU 22 accepts a failure notification indicating that the change of the setting value has failed from the printer to which the setting file was sent, the CPU 22 does not accept the success notification either. For example, in a case where the printer is incapable of interpreting the setting file, the failure notification is sent from the printer to the terminal device 10.

The character string "Changing" indicates that the setting file is still being sent. The character string "Wait" indicates that the sending of the setting file has not been yet performed.

In S34, the CPU 22 monitors whether or not the sending of the setting files to all the printers in the printer groups 100, 200 has completed, and when the sending has completed (YES in S34), the CPU 22 proceeds to S40.

In S40, the CPU 22 determines whether or not there is any failure printer for which the change of the setting value has failed, i.e., whether or not at least one failure information has been specified. In a case where no failure information has been specified (NO in S40), the CPU 22 proceeds to S42, whereas in a case where at least one failure information has been specified (YES in S40), the CPU 22 proceeds to S44.

In S42, the CPU 22 displays a success dialog DL 30 in FIG. 10 on the display unit 14. Further, in S44, the CPU 22 displays a failure dialog DL32 in FIG. 11, etc. on the display unit 14. When the process of S42 or S44 has completed, the sending process of FIG. 9 completes.

(Case A in which Setting Change in all Printers Succeeds; FIG. 10)

As shown in FIG. 10, the success dialog DL30 is a screen for notifying the user that the change of the setting values in accordance with the setting files 28a, 28b has succeeded in all the printers 100, 200. Further, the success dialog DL30 includes an open log icon A50. In a case where the CPU 22 accepts an instruction for selecting the open log icon A50, the CPU 22 displays a result dialog DL31 on the display unit 14. The result dialog DL31 includes a date and time when the send icon A6 was selected (i.e., date and time when the sending process of FIG. 9 was started), and a character string indicating that the change of the setting values in all the printers 100, 200 succeeded.

Further, the CPU 22 displays a device screen SC30 on the display unit 14 along with the success dialog DL30. The device screen SC30 is the same as the device screen SC22 in FIG. 7, and all boxes of the selection box group C2 have the unselected form.

(Case B1 in which Setting Change Fails in Some Printers; FIGS. 11 to 13)

As shown in FIG. 11, the failure dialog DL32 is a screen for notifying the user that the change of the setting value in accordance with the setting file has failed in some printers. In the present case B1, the change of the setting value succeeds in all the printers in the printer group 100, but the change of the setting value fails in all the printers in the printer group 200.

The printer 202 (see FIG. 1) having the serial number "SNB002" disengages from the LAN 4 after the search in response to the selection of the add icon A1 in FIG. 2 has been performed. As a result of this, since the setting file 28b cannot be sent to the printer 202, neither the success notification nor the failure notification is accepted from the printer 202. In this case, the CPU 22 specifies a cause of the failure in the setting change at the printer 202 as the printer 202 not being connected to the LAN 4. Therefore, the combination information including the serial number "SNB002" corresponding to the printer 202 includes a character string "Not Connected" indicating that the setting change has failed due to the printer 202 not being connected to the LAN 4 as the status information.

Further, of the printer group 200, ninety-nine printers other than the printer 202 are incapable of interpreting the setting file 28b. As a result of this, the failure notification is received from each printer. In this case, the CPU 22 specifies a cause of the failure in the setting change at each printer as a content of the setting file 28b. Therefore, each of the combination information corresponding to each of the respective printers other than the printer 202 includes a character string "File Error" indicating that the setting change has failed due to the content of the setting file 28b as the status information.

Further, the failure dialog DL32 includes an open log icon A52. In a case where the CPU 22 accepts an instruction for selecting the open log icon A52, the CPU 22 displays a result dialog DL34 on the display unit 14. The result dialog DL34 includes a date and time when the send icon A6 was selected, a character string indicating that the change of the setting value succeeded in the printer group 100, a character string indicating that the change of the setting value failed in the printer group 200, and character strings indicating the cause of the failure in the setting change.

Further, the CPU 22 displays the device screen SC32 on the display unit 14 along with the failure dialog DL32. In the device screen SC32, the selection box group C21 included in the combination information group P3 corresponding to the printer group 100 for which the change of the setting value has succeeded has the unselected form, while the selection box group C22 included in the combination information group P4 corresponding to the printer group 200 for which the change of the setting value has failed has the selected form. Then, the combination information group P4 includes failure symbols FS1 indicating that the change of the setting value has failed. This enables the user to know, by looking at the device screen SC32, that the change of the setting value in the printer group 200 has failed. Further, in the printer display area DA1 in the device screen SC32, the combination information group P3 includes the file name "xxx.file" and the combination information group P4 includes the file name "yyy.file". This enables the user to know, by looking at the device screen SC32, that the change of the setting value in accordance with the setting file 28a has succeeded, and the change of the setting value in accordance with the setting file 28b has failed.

Further, in a case where the CPU 22 accepts an instruction for selecting one of the combination information in the device screen SC32, the CPU 22 displays a menu screen MS2 on the display unit 14. The menu screen MS2 includes a set icon A60, a remove icon A62, and an open log icon A64. In a case where the CPU 22 accepts an instruction for selecting the display icon A64, the CPU 22 displays the result dialog DL34 same as above mentioned on the display unit 14.

In the present case B1, the user wishes to send another setting file to the printer group 200 for which the change of setting value has failed. It should be however noted that, the user does not wish to send a setting file to the printer 202 that is not connected to the LAN 4. With reference to FIGS. 12 and 13, a process of sending another setting file to the printer group 200 will be described.

As mentioned above, in the device screen SC32, the selection box group C21 included in the combination information group P3 has the unselected form, while the selection box group C22 included in the combination information group P4 has the selected form. Therefore, the user can designate another setting file to the respective printer information corresponding to the printer group 200 even if the user does not perform an operation for changing the selection box group C22 to the selected form. User convenience can be improved. However, since the user does not wish to send a setting file to the printer 202, the user selects the selection box corresponding to the serial number "SNB002" of the printer 202. In this case, the CPU 22 displays the device screen SC34 in which the selection box corresponding to the serial number "SNB002" has the unselected form on the display unit 14.

Next, in a case where the CPU 22 accepts an instruction for selecting the set icon A4 in the device screen SC34, the CPU 22 displays the dialog DL14 on the display unit 14. Then, in a case where the CPU 22 accepts an instruction for designating the file name of the setting file 28c "zzz.file" in the display area DA4 in the dialog DL14 and an instruction for selecting the OK icon A26, the CPU 22 displays a device screen SC36 in FIG. 13 on the display unit 14.

In the device screen SC36, among the combination information group P4, one of the combination information including the serial number "SNB002" includes the file name "yyy.file". On the other hand, the other ninety-nine combination information of the combination information group P4 include the file name "zzz.file". In a case where the CPU 22 accepts an instruction for selecting the send icon A6 in the device screen SC36, the CPU 22 executes the sending process of FIG. 9 to send the setting file 28c indicated by the file name "zzz.file" to the ninety-nine printers other than the printer 202 among the printer group 200. The setting file 28c is not sent to the printer 202. Due to this, the change of the setting value in accordance with the setting file 28c is performed in each of the ninety-nine printers.

Further, a situation may be assumed where the user wishes a change of a setting value in accordance with the setting file 28a different from the setting files 28b, 28c to be performed in a part, namely the printer 201, of the above mentioned ninety-nine printers. In this case, the user selects one of the combination information including the serial number "SNB001" for example. In this case, in a case where the CPU 22 accepts an instruction for displaying the menu screen MS2 on the display unit 14 and selecting the set icon A60 in the menu screen MS2, the CPU 22 displays the dialog DL14 on the display unit 14. Then, in a case where the CPU 22 accepts an instruction for designating the file name of the setting file 28a "xxx.file" in the display area DA4 in the dialog DL14 and selecting the instruction for selecting the OK icon A26, the CPU 22 displays a device screen SC38 on the display unit 14.

In the device screen SC38, the combination information including the serial number "SNB001" includes the file name "xxx.file". That is, among the printer group 200, the combination information corresponding to the printer 201 includes the file name "xxx.file", the combination information corresponding to the printer 202 includes the selection box having the unselected form, and each of the combination information corresponding to the other 98 printers includes the file name "zzz.file". In a case where the CPU 22 accepts an instruction for selecting the send icon A6 in the device screen SC38, the CPU 22 executes the sending process of FIG. 9 to send the setting file 28c indicated by the file name "zzz.file" to the above 98 printers and send the setting file 28a indicated by the file name "xxx.file" to the one printer 201. Neither of the setting files 28a, 28c is sent to the printer 202. Due to this, the change of the setting value in accordance with the setting file 28c is performed in each of the 98 printers, whereas the change of the setting value in accordance with the setting file 28a is performed in the printer 201.

Figure 15:
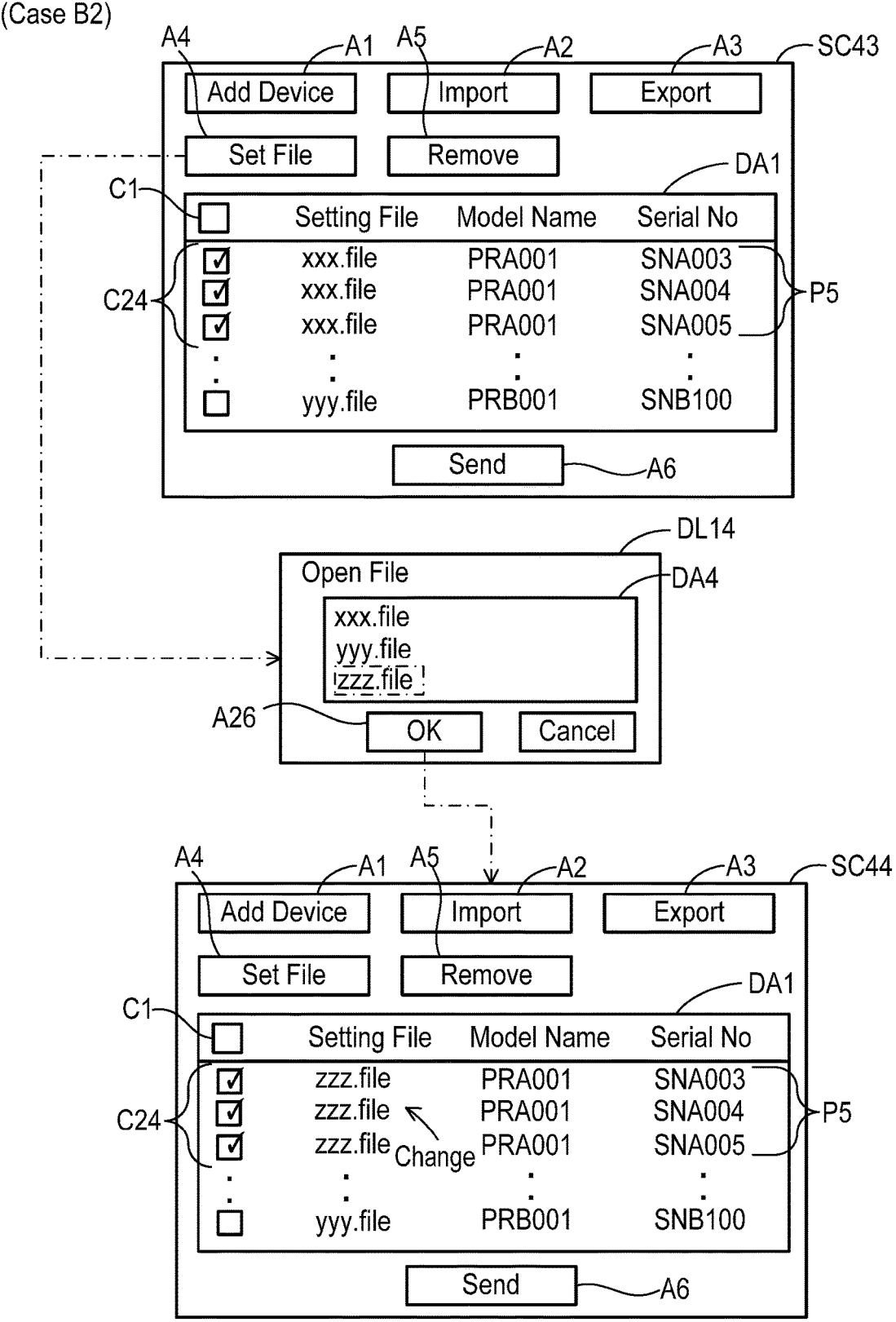
FIG. 15 illustrates screens in case B2 where a setting file is selectively designated for one or more of the printers in which the setting change has succeeded.
Figure 16:
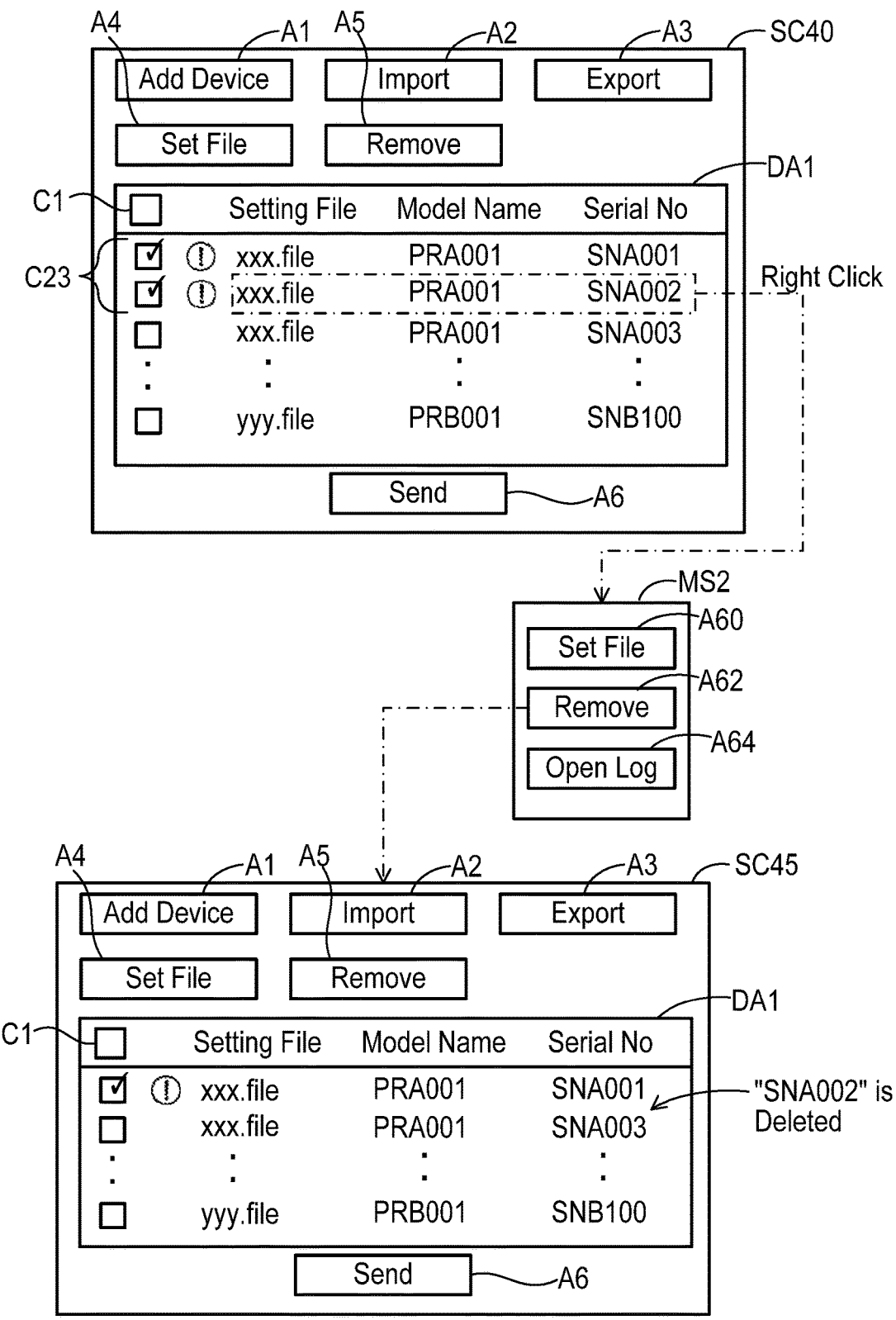
FIG. 16 illustrates screens in case B2 where one printer information is deleted from the respective printer information for which the setting change has failed.

(Case B2 in which Setting Change Fails in Some Printers; FIGS. 14 to 16)

In the present case B2, a change of a setting value fails in, among the printer group 100, the printer 101 (serial number "SNA001") and the printer 102 (serial number "SNA002") due to the printers 101 and 102 not being connected to the LAN 4. In a failure dialog DL36, two combination information corresponding to the two printers 101, 102 include the character string "Not Connected" as the status information. Further, in a device screen SC40, two selection boxes C23 included in the two combination information corresponding to the two printers 101, 102 for which the change of the setting value has failed have the selected form, while each of the other selection boxes has the unselected form.

In the present case B2, the user does not wish to send a setting file to the two printers 101, 102. In a case where the CPU 22 accepts an instruction for selecting the remove icon A5 in the device screen SC40, the CPU 22 displays, on the display unit 14, a device screen SC42 in which the two combination information corresponding to the two printers 101, 102 have been deleted. Thus, the user can collectively delete the two combination information corresponding to the two printers 101, 102 for which the change of the setting value has failed. For example, a situation may be assumed where the user wishes to save, in the memory 24, the profile information corresponding to the device screen SC42 after the deletion. According to the above configuration, the user can manage the information as he/she wishes.

Further, a situation may be assumed where the user wishes to send another setting file to a printer for which a change of a setting value has succeeded. In a case where the CPU 22 accepts an instruction for selecting a selection box group C24 included in a combination information group P5 having the serial numbers "SNA003" to "SNA005" in the device screen SC42, the CPU 22 displays a device screen SC43 in FIG. 15 on the display unit 14. In the device screen SC43, the selection box group C24 has the selected form. In a case where the CPU 22 accepts an instruction for selecting the set icon A4 in the device screen SC43, the CPU 22 displays the dialog DL14 on the display unit 14. In a case where the CPU 22 accepts an instruction for designating the file name of the setting file 28c "zzz.file" in the display area DA4 of the dialog DL14 and an instruction for selecting the OK icon A26, the CPU 22 displays a device screen SC44 on the display unit 14. In a case where the CPU 22 accepts an instruction for selecting the send icon A6 in the device screen SC44, the CPU 22 executes the sending process of FIG. 9 to send the setting file 28c indicated by the file name "zzz.file" to three printers having the serial numbers "SNA003" to "SNA005". The setting file 28c is not sent to one-hundred and ninety-five printers other than the three printers. Due to this, the change of the setting value in accordance with the setting file 28c is performed in each of the three printers for which the change of the setting value had succeeded. According to the above configuration, such user's wish can be satisfied.

A situation may be assumed where the user wishes to send another setting file to the printer 101, but not wish to send the same to the printer 102. As shown in FIG. 16, in a case where the CPU 22 accepts an instruction for selecting one combination information corresponding to the printer 102 (serial number "SNA002") in the device screen SC40, the CPU 22 displays the menu screen MS2 on the display unit 14. In a case where the CPU 22 accepts an instruction for selecting the remove icon A62 in the menu screen MS2, the CPU 22 displays, on the display unit 14, a device screen SC45 in which only the one combination information corresponding to the printer 102 has been removed. Thus, the user is able to delete the one combination information corresponding to one printer 102 from among the two printers 101, 102 for which the change of the setting value had failed. Due to this, the user is able to send another setting file to the printer 101 by connecting the printer 101 to the LAN 4.

(Effects of Embodiment

According to the present embodiment, the user designates the setting file 28a (i.e., file name "xxx.file") in a state where the combination information group P3 corresponding to the printer group 100 has been selected in the device screen SC14 in FIG. 3. Subsequently, the user designates the setting file 28b (i.e., file name "yyy.file") in a state where the combination information group P4 corresponding to the printer group 200 has been selected in the device screen SC16 in FIG. 6. Then, the user selects the send icon A6 in the device screen SC24 in FIG. 7. Due to this, the sending process of FIG. 9 is performed. That is, the user simply may not have to, in order to both send the setting file 28a to the printer group 100 and send the setting file 28b to the printer group 200, select the send icon A6 over a plurality of times, but simply needs to select the send icon A6 only once. Therefore, user convenience can be improved.

Further, the user can know, by looking at the device screen SC32 in FIG. 11, that in the printer group 100 corresponding to the combination information group P3 having the unselected form, the change of the setting value in accordance with the setting file 28a has succeeded, and in the printer group 200 corresponding to the combination information group P4 having the selected form, the change of the setting value in accordance with the setting file 28*b* has failed. Then, as indicated in the device screen SC34 in FIG. 12, the user can change, in the combination information group P4, the selection box included in the one combination information including the serial number "SNB002" from the selected form to the unselected form. As a result of this, in a case where the send icon A6 in the device screen SC36 in FIG. 13 is selected, the setting file 28*c* is not sent to the printer 202 corresponding to the serial number "SNB002" but sent to the other ninety-nine printers of the printer group 200. Due to this, the change of the setting value in accordance with the setting file 28*c* can be realized only in the ninety-nine printers being a part of the printer group 200 for which the change of the setting value in accordance with the setting file 28*b* has failed.

(Correspondence Relationships)

The terminal device 10 is an example of "a terminal device". The printer groups 100, 200 are examples of "a plurality of devices". The printer information groups included in the combination information groups P3, P4 are examples of "a plurality of device information". Respective setting values in the setting files 28*a*, 28*b* are examples of "first setting information". The instruction for selecting the send icon A6 in the device screen SC24 in FIG. 7 is an example of "a first sending instruction". The device screen SC32 and the menu screen MS2 in FIG. 11 are an example of "a first device screen". The printer information group included in the combination information group P3 in the SC32, the printer information group included in the combination information group P4, the printer group 100, and the printer group 200 are respectively examples of "M success device information", "N failure device information", "M success devices", and "N failure devices". The instruction for selecting the selection box corresponding to the serial number "SNB001" in the SC32 in FIG. 12 and the device screen SC34 are respectively examples of "a change instruction" and "a first changed screen". In the printer information group included in the combination information group P4, the printer information including the serial number "SNB002" and the other ninety-nine printer information are respectively examples of "N1 failure device information" and "N2 failure device information". The instruction for selecting the send icon A6 in the device screen SC36 in FIG. 13 is an example of "a second sending instruction".

The instruction for selecting the add icon A1 in the device screen SC10 in FIG. 2 is an example of "a display instruction". The device screen SC12 in FIG. 3 is an example of "a second device screen". The selection box groups C21, C22 in SC12 are an example of "a change instruction area". The set icon A60 in the menu screen MS2 and the set icon A4 in FIG. 11 are respectively examples of "a first designation instruction area" and "a second designation instruction area". The remove icon A62 in the MS2, the remove icon A5, and the SC42 in FIG. 14 (or SC45 in FIG. 16) are respectively examples of "a first deleting instruction area", the "second designation instruction area", "a deleted screen". The display icon A64 in the MS2 and the dialog DL34 in FIG. 11 are respectively examples of "a result instruction area" and "a result screen". The selection box group C2, a file name or the character string "None", the check symbol are respectively examples of "a selection area", "a setting character string", and "a specific symbol". The printer information included in the combination information group P5, the SC43 in FIG. 15, the setting value described in the setting file 28*c*, the instruction for selecting the send icon A6 in the SC44, the three printers corresponding to the combination information group P5, and the remaining one-hundred and ninety-five printers in FIG. 15 are respectively examples of "M1 success device information", "a second changed screen", "third setting information", "a third sending instruction", "M1 success devices", and "M2 success devices". The SC36 in FIG. 13 is an example of "a designated screen". The setting value described in the setting file 28*a*, the setting value described in the setting file 28*b*, the printer group 100, and the printer group 200 are respectively examples of "a first setting value", "a second setting value", "a first device group", and "a second device group".

Modification 1

In a case where the set icon A4 in the device screen SC14 in FIG. 3 is selected, the CPU 22 may display, instead of the dialog DL14, a dialog including an inputting area for inputting one setting value only (e.g., default print resolution) on the display unit 14. In this case, one setting value that has been input for each of the printer information may be designated, and the inputted one setting value only may be sent to each printer. Generally speaking, the "first setting information" and the "second setting information" may include at least one setting value.

Modification 2

Each of the device screens (SC10 to SC45) may not include the selection box groups C2, C21, and C22. Instead of these, each of the combination information having the selected form may be displayed in a first color, and each of the combination information having the unselected form may be displayed in a second color different from the first color. In the present modification, the "first device screen" may not include "a selection area".

Modification 3

The CPU 22 may not display screens, i.e., from the device screen SC10 in FIG. 2 to the device screen SC26 in FIG. 8 on the display unit 14. In this case, the CPU 22 displays the dialog DL14 in FIG. 3 on the display unit 14 in response to the program 26 being activated. In a case where the CPU 22 accepts an instruction for designating the setting file in the display area DA4 and an instruction for selecting the OK icon A26 in the dialog DL14, the CPU 22 may send the designated setting file to the printer groups 100, 200 by broadcasting the designated setting file to the LAN 4. In the present modification, the instruction accepted in the dialog DL14 is an example of the "first sending instruction", and "cause the display unit to display a second device screen including the plurality of device information" may be omitted.

Modification 4

Each of the device screens (SC10 to SC45) may not include the set icon A4. For example, in a case where the CPU 22 accepts an instruction for selecting a predetermined key in a keyboard being the operation unit 12 while the device screen SC34 in FIG. 12 is displayed, the CPU 22 may display the dialog DL14 on the display unit 14. In the present modification, the "first device screen" may not include the "first designation instruction area". Further, the menu screen MS2 may not include the set icon A60. In the present modification, the "first device screen" does not include the "second designation instruction area".

Modification 5

Each of the device screens (SC10 to SC45) may not include the remove icon A5. Further, the menu screen MS2 may not include the remove icon A62. In the present modification, the "first device screen" does not include the "first deletion instruction area", "second deletion instruction area", and "cause the display unit to display a deleted screen" may be omitted.

Modification 6

The printer display area DA1 may not include the setting names of the setting files. In the present modification, the "first device screen" does not include the "setting character string".

Modification 7

The menu screen MS2 may not include the display icon A64. In the present modification, the "first device screen" does not include the "result instruction area", and "cause the display unit to display a result screen" may be omitted.

Modification 8

In a case where the CPU 22 accepts the instruction for selecting the set icon A4 in the device screen SC34 in FIG. 12, the CPU 22 may display, instead of the dialog DL14, a change screen for changing a setting value in the setting file 28b on the display unit 14. In a case where the CPU 22 accepts an instruction for changing a setting value in the change screen, the CPU 22 may save, in the memory 24, the new setting file 28b in which the changed setting value is described. Thereafter, in a case where the CPU 22 accepts an instruction for selecting the send icon A6 in the device screen SC34, the CPU 22 may send the new setting file 28b to each printer. In the present modification, the new setting file is an example of the "second setting information".

Modification 9

In the present embodiment, the device screen comprises two screens, namely, a screen body (e.g., SC12 in FIG. 11) and the menu screen MS2. Alternatively, the device screen may comprise one screen including the screen body and the menu screen. In the present modification, the one screen is an example of the "first device screen".

Modification 10

In a case where the CPU 22 accepts the instruction for selecting the OK icon A22 in the dialog DL11 in FIG. 2, the CPU 22 may display, instead of the device screen SC12 in FIG. 3, the device screen SC14 on the display unit 14. That is, in the "second device screen", all of the plurality of device information may be displayed in the selected form.

Modification 11

The "device" may not be a printer, but may be a scanner, a facsimile, a multi-functional peripheral, a PC, a server, a mobile terminal, etc. For example, if it is a scanner, the "setting information" may be a value related to a scan function (e.g., default scan resolution, information indicating where scan data is to be sent).

Further, the present teachings disclose the following art. Conventionally, a communication system including a plurality of devices and a management device for managing the plurality of devices has been known. When accepting a designation of one setting value to be sent to each of the plurality of devices from a user, the management device sends the one setting value to each of the plurality of devices. Due to this, a setting value of each device is changed to the setting value that has been sent to the device.

For example, a situation may be assumed where a user wishes both sending of a first setting value to one device group and sending of a second setting value to another device group to be performed. In this case, with the above art, after the sending of the first setting value to the one device group has been finished, the user has to designate the second setting value to be sent to the other device group. That is, the second setting value cannot be designated for the other device group until the sending of the first setting value to the one device group has been finished. Due to this, the user may feel inconvenience.

The present teachings provide an art that may improve user convenience for realizing both sending of first setting information to two or more devices and sending of second setting information to two or more devices.

The present teachings may further disclose a non-transitory computer-readable medium storing computer-readable instructions for a terminal device, wherein the computer-readable instructions, when executed by a processor of the terminal device, may cause the terminal device to:

cause a display unit to display a first device screen including M device information corresponding to M devices, the M being an integer equal to or greater than four;

in response to accepting a first instruction after the first device screen has been displayed, cause the display unit to display a second device screen which is different from the first device screen, the first instruction including a selecting instruction for selecting M1 device information from among the M device information and a first designation instruction for designating first setting information for each of the selected M1 device information, the second device screen including M2 device information among the M device information, the M2 device information being different from the M1 device information, the M1 being an integer equal to or greater than two and less than the M, and the M2 being an integer equal to or greater than two and less than the M;

in response to accepting a second instruction after the second device screen has been displayed, cause the display unit to display a third device screen including a sending instruction area, the second instruction being for designating second setting information, which is different from the first setting information, for each of the M2 device information, the sending instruction area being for accepting a sending instruction for instructing both of sending the first setting information to each of M1 devices corresponding to the M1 device information and sending the second setting information to each of M2 devices corresponding to the M2 device information; and in response to accepting the sending instruction in the sending instruction area in the third device screen, send the first setting information to each of the M1 devices and send the second setting information to each of the M2 devices.

According to the above configuration, the user can provide, in the first device screen, the first instruction for designating the first setting information for each of the M1 device information, and in the second device screen, can provide the second instruction for designating the second setting information for each of the M2 device information. Then, the user can provide the sending instruction in the third device screen. Due to this, it suffices for the user to provide the sending instruction once in order to realize both sending of the first setting information to each of the M1 devices and sending of the second setting information to each of the M2 devices. For this reason, user convenience can be improved.

The terminal device 10 is an example of the "terminal device". The printer groups 100, 200 are examples of the "M devices". The device screen SC12 and the menu screen MS1 in FIG. 3 are an example of the "first device screen". The printer information groups included in the combination information groups P3, P4 are an example of the "M device information". The device screen SC16 and the MS1 in FIG. 4 are an example of the "second device screen". The printer information group included in the combination information group P3, the printer information group included in the combination information group P4, and the setting file 28*a* are respectively examples of the "M1 device information", the "M2 device information", and the "first setting information". The device screen SC24 and the MS1 in FIG. 7 are an example of the "third device screen". The setting file 28*b* and the send icon A6 are respectively examples of the "second setting information" and the "sending instruction area".

The configurations described above also encompass various changes and modifications to the specific examples described above. Modifications of the above embodiments will be listed hereinbelow.

Reference Example 1

The above modification 1 may be implemented. That is, the "first setting information" and the "second setting information" may not be one setting file but may be one setting value. Further, the above modification 2 may be implemented.

Reference Example 2

The device screen SC16 in FIG. 4 may not include the combination information group P3 for which the setting file has been designated, but may include only the combination information group P4 for which a setting file has not been yet designated. The device screen SC22 in FIG. 6 may not include the combination information groups P3, P4 for which the setting file has been designated, but may include only the send icon A6.

Reference Example 3

In the device screen SC16 in FIG. 4, the selection box group C22 included in the combination information group P4 may be displayed in the unselected form.

Reference Example 4

Each device screen (SC10 to SC44) may not include the set icon A4. For example, in a case where the CPU 22 accepts an instruction for selecting a predetermined key in the keyboard being the operation unit 12 in a situation where the device screen SC14 in FIG. 3 is displayed, the CPU 22 may display the dialog DL14 on the display unit 14.

Reference Example 5

The printer display area DA1 in each device screen (SC10 to SC44) may not include the select-all box C1.

Reference Example 6

The printer display area DA1 may not include a file name representing a setting file.

Reference Example 7

In any of the device screens (e.g., SC10 to SC16), the send icon A6 may be displayed in the available form. In the present reference example, the send icon A6 may be selected in a situation where a setting file has not been designated for any of the printer information (e.g., situation where the device screen SC14 is displayed). In this case, the CPU 22 may display, on the display unit 14, a notification screen for notifying the user that a setting file cannot be sent.

Reference Example 8

The process of S12 in FIG. 9 may be omitted.

Reference Example 9

Each device screen (SC10 to SC44) may not include the remove icon A5. Further, the menu screen MS2 may not include the remove icon A62.

Reference Example 10

Each device screen (SC10 to SC44) may not include the import icon A2 and the export icon A3.

Reference Example 11

In a case where the CPU 22 accepts an instruction for selecting the set icon A4 in the device screen SC14 in FIG. 3, the CPU 22 may display, instead of the dialog DL14, on the display unit 14, an inputting screen for inputting a setting value. In a case where the CPU 22 accepts an input of a setting value in the inputting screen, the CPU 22 may display, on the display unit 14, a device screen including the combination information group P3 including the inputted setting value. In the present reference example, the inputted setting value is an example of the "first setting information".

What is claimed is:

1. A non-transitory computer-readable medium storing computer-readable instructions for a terminal device,
    the computer-readable instructions, when executed by a processor of the terminal device, causing the terminal device to:
    in response to accepting a first sending instruction for instructing sending of first setting information to a plurality of devices, send the first setting information to the plurality of devices as destinations;
    in response to sending the first setting information to the plurality of devices as destinations, specify, from among the plurality of devices, M success devices and N failure devices, the M being an integer equal to or greater than one, the N being an integer equal to or greater than two, the N failure devices not including any of the M success devices, each of the M success devices being a device for which a change to the first setting information has succeeded, and each of the N failure devices being a device for which the change to the first setting information has failed;

in response to specifying the M success devices and the N failure devices, cause a display unit of the terminal device to display a first device screen including a plurality of device information corresponding to the plurality of devices, the plurality of device information including M success device information corresponding to the M success devices and N failure device information corresponding to the N failure devices, wherein in the first device screen, each of the M success device information is displayed in an unselected form indicating that device information is not being selected, and each of the N failure device information is displayed in a selected form indicating that device information is being selected;

in response to accepting a first change instruction for changing a display form of each of N1 failure device information among the N failure device information from the selected form to the unselected form after the first device screen has been displayed, cause the display unit to display a first changed screen, wherein in the first changed screen, each of the N1 failure device information is displayed in the unselected form, and each of N2 failure device information other than the N1 failure device information among the N failure device information is displayed in the selected form, the N1 being an integer equal to or greater than one and less than the N, and the N2 being an integer which meets "N2=N−N1"; and in response to accepting a second sending instruction for instructing sending of second setting information under a situation where each of the N1 failure device information is displayed in the unselected form and each of the N2 failure device information is displayed in the selected form, send the second setting information to N2 failure devices corresponding to the N2 failure device information as destinations, the second setting information being not sent to N1 failure devices corresponding to the N1 failure device information even if the second sending instruction has been accepted.

2. The non-transitory computer-readable medium as in claim 1, wherein the computer-readable instructions, when executed by the processor of the terminal device, further cause the terminal device to:

in response to accepting a display instruction for displaying the plurality of device information before accepting the first sending instruction, cause the display unit to display a second device screen including the plurality of device information, wherein in the second device screen, all of the plurality of device information are displayed in the unselected form or the selected form, and the second device screen includes, for each of the plurality of device information, a change instruction area for accepting a change instruction for changing a display form of the device information between the unselected form and the selected form, wherein the first sending instruction is accepted under a situation where all of the plurality of device information are displayed in the selected form after the second device screen has been displayed.

3. The non-transitory computer-readable medium as in claim 1, wherein the computer-readable instructions, when executed by the processor of the terminal device, further cause the terminal device to:

in response to accepting a second change instruction for changing a display form of M1 success device information from the unselected form to the selected form after the first device screen has been displayed, cause the display unit to display a second changed screen, wherein in the second changed screen, each of the M1 success device information among the M success device information is displayed in the selected form, and each of M2 success device information other than the M1 success device information among the M success device information is displayed in the unselected form, the M1 being an integer equal to or greater than one and less than the M, and the M2 being an integer which meets "M2=M−M1"; and in response to accepting a third sending instruction for instructing sending of third setting information under a situation where each of the M1 success device information is displayed in the selected form and each of the M2 success device information is displayed in the unselected form, send the third setting information to M1 success devices corresponding to the M1 success device information as destinations, the third setting information being not sent to M2 success devices corresponding to the M2 success device information even if the third sending instruction has been accepted.

4. The non-transitory computer-readable medium as in claim 1, wherein the first device screen includes:

a first designation instruction area for accepting a designation instruction for only one of the plurality of device information, the designation instruction being for designating setting information; and a second designation instruction area for accepting the designation instruction for all of one or more of the plurality of device information which are displayed in the selected form, and in response to accepting the second sending instruction, the second setting information being designated for the N2 failure device information by the designation instruction is sent to the N2 failure devices.

5. The non-transitory computer-readable medium as in claim 1, wherein the first device screen includes:

a first deleting instruction area for accepting a deleting instruction for only one of the plurality of device information; and a second deleting instruction area for accepting the deleting instruction for all of one or more of the plurality of device information which are displayed in selected form, and the computer-readable instructions, when executed by the processor of the terminal device, further cause the terminal device to:

in response to accepting the deleting instruction, cause the display unit to display a deleted screen which does not include one or more of the device information to which the deleting instruction was given.

6. The non-transitory computer-readable medium as in claim 1, wherein in the first device screen, for each of the plurality of device information, the device information, a selection area for selecting the device information, and a setting character string related to setting information designated for the device information are associated with each other, the selected form is a form where the selection area includes a predetermined symbol, and the unselected form is a form where the selection area does not include the predetermined symbol.

7. The non-transitory computer-readable medium as in claim 6, wherein
in the first device screen,
for each of the M success device information, the success device information, the selection area not including the predetermined symbol, and the setting character string representing the first setting information designated for the success device information are associated with each other; and
for each of the N failure device information, the failure device information, the selection area including the predetermined symbol, and the setting character string representing the first setting information designated for the failure device information are associated with each other.

8. The non-transitory computer-readable medium as in claim 7, wherein
in the first changed screen,
for each of the N1 failure device information, the failure device information, the selection area not including the predetermined symbol, and the setting character string representing the first setting information designated for the failure device information are associated with each other; and
for each of the N2 failure device information, the failure device information, the selection area including the predetermined symbol, and the setting character string representing the first setting information designated for the failure device information are associated with each other, and
the computer-readable instructions, when executed by the processor of the terminal device, further cause the terminal device to:
in response to accepting a designation instruction for designating the second setting information including a setting value which is different from a setting value included in the first setting information for the N2 failure device information after the first changed screen has been displayed, cause the display unit to display a designated screen,
wherein in the designated screen,
for each of the N1 failure device information, the failure device information, the selection area not including the predetermined symbol, and the setting character string representing the first setting information designated for the failure device information are associated with each other; and
for each of the N2 failure device information, the failure device information, the selection area including the predetermined symbol, and the setting character string representing the second setting information designated for the failure device information are associated with each other.

9. The non-transitory computer-readable medium as in claim 1, wherein
the first device screen includes a result instruction area for accepting a result instruction, the result instruction being for displaying a result that the change to the first setting information was not performed in the N failure devices in response to sending the first setting information to the plurality of devices as destinations, and
the computer-readable instructions, when executed by the processor of the terminal device, further cause the terminal device to:
in response to accepting the result instruction, cause the display unit to display a result screen representing the result.

10. The non-transitory computer-readable medium as in claim 1, wherein
the M success devices are specified in a case where a success notice indicating that the change to the first setting information has succeeded is received from each of the M success devices, and
the N failure devices are specified in a case where the success notice is not received from each of the N failure devices.

11. The non-transitory computer-readable medium as in claim 1, wherein
in response to accepting the first sending instruction, the first setting information including a first setting value is sent to a first device group as destinations which is a part of the plurality of devices, and
in response to accepting the first sending instruction, the first setting information including a second setting value being different from the first setting value is sent to a second device group other than the first device group among the plurality of devices as destinations.

12. The non-transitory computer-readable medium as in claim 1, wherein
each of the plurality of devices is capable of performing at least one of a print function and a scan function, and
each of the first setting information and the second setting information includes a setting value related to the at least one function.

13. A terminal device comprising:
a display unit;
a processor; and
a memory configured to store computer-readable instructions therein, the computer-readable instructions, when executed by the processor, causing the terminal device to:
in response to accepting a first sending instruction for instructing sending of first setting information to a plurality of devices, send the first setting information to the plurality of devices as destinations;
in response to sending the first setting information to the plurality of devices as destinations, specify, from among the plurality of devices, M success devices and N failure devices, the M being an integer equal to or greater than one, the N being an integer equal to or greater than two, the N failure devices not including any of the M success devices, each of the M success devices being a device for which a change to the first setting information has succeeded, and each of the N failure devices being a device for which the change to the first setting information has failed;
in response to specifying the M success devices and the N failure devices, cause the display unit to display a first device screen including a plurality of device information corresponding to the plurality of devices, the plurality of device information including M success device information corresponding to the M success devices and N failure device information corresponding to the N failure devices, wherein in the first device screen, each of the M success device information is displayed in an unselected form indicating that device information is not being selected, and each of the N failure device information is displayed in a selected form indicating that device information is being selected;

in response to accepting a first change instruction for changing a display form of each of N1 failure device information among the N failure device information from the selected form to the unselected form after the first device screen has been displayed, cause the display unit to display a first changed screen, wherein in the first changed screen, each of the N1 failure device information is displayed in the unselected form, and each of N2 failure device information other than the N1 failure device information among the N failure device information is displayed in the selected form, the N1 being an integer equal to or greater than one and less than the N, and the N2 being an integer which meets "N2=N−N1"; and in response to accepting a second sending instruction for instructing sending of second setting information under a situation where each of the N1 failure device information is displayed in the unselected form and each of the N2 failure device information is displayed in the selected form, send the second setting information to N2 failure devices corresponding to the N2 failure device information as destinations, the second setting information being not sent to N1 failure devices corresponding to the N1 failure device information even if the second sending instruction has been accepted.

14. The terminal device as in claim 13, wherein
the computer-readable instructions, when executed by the processor, further cause the terminal device to:
in response to accepting a display instruction for displaying the plurality of device information before accepting the first sending instruction, cause the display unit to display a second device screen including the plurality of device information, wherein in the second device screen, all of the plurality of device information are displayed in the unselected form or the selected form, and the second device screen includes, for each of the plurality of device information, a change instruction area for accepting a change instruction for changing a display form of the device information between the unselected form and the selected form,
wherein the first sending instruction is accepted under a situation where all of the plurality of device information are displayed in the selected form after the second device screen has been displayed.

15. The terminal device as in claim 13, wherein
the computer-readable instructions, when executed by the processor, further cause the terminal device to:
in response to accepting a second change instruction for changing a display form of M1 success device information from the unselected form to the selected form after the first device screen has been displayed, cause the display unit to display a second changed screen, wherein in the second changed screen, each of the M1 success device information among the M success device information is displayed in the selected form, and each of M2 success device information other than the M1 success device information among the M success device information is displayed in the unselected form, the M1 being an integer equal to or greater than one and less than the M, and the M2 being an integer which meets "M2=M−M1"; and in response to accepting a third sending instruction for instructing sending of third setting information under a situation where each of the M1 success device information is displayed in the selected form and each of the M2 success device information is displayed in the unselected form, send the third setting information to M1 success devices corresponding to the M1 success device information as destinations, the third setting information being not sent to M2 success devices corresponding to the M2 success device information even if the third sending instruction has been accepted.

16. The terminal device as in claim 13, wherein
the first device screen includes:
a first designation instruction area for accepting a designation instruction for only one of the plurality of device information, the designation instruction being for designating setting information; and
a second designation instruction area for accepting the designation instruction for all of one or more of the plurality of device information which are displayed in the selected form, and
in response to accepting the second sending instruction, the second setting information being designated for the N2 failure device information by the designation instruction is sent to the N2 failure devices.

17. The terminal device as in claim 13, wherein
the first device screen includes:
a first deleting instruction area for accepting a deleting instruction for only one of the plurality of device information; and
a second deleting instruction area for accepting the deleting instruction for all of one or more of the plurality of device information which are displayed in selected form, and
the computer-readable instructions, when executed by the processor, further cause the terminal device to:
in response to accepting the deleting instruction, cause the display unit to display a deleted screen which does not include one or more of the device information to which the deleting instruction was given.

18. The terminal device as in claim 13, wherein
in the first device screen, for each of the plurality of device information, the device information, a selection area for selecting the device information, and a setting character string related to setting information designated for the device information are associated with each other,
the selected form is a form where the selection area includes a predetermined symbol, and
the unselected form is a form where the selection area does not include the predetermined symbol.

19. The terminal device as in claim 18, wherein
in the first device screen,
for each of the M success device information, the success device information, the selection area not including the predetermined symbol, and the setting character string representing the first setting information designated for the success device information are associated with each other; and
for each of the N failure device information, the failure device information, the selection area including the predetermined symbol, and the setting character string representing the first setting information designated for the failure device information are associated with each other.

20. A method performed by a terminal device,
the method comprising:
in response to accepting a first sending instruction for instructing sending of first setting information to a plurality of devices, sending the first setting information to the plurality of devices as destinations;
in response to sending the first setting information to the plurality of devices as destinations, specifying, from among the plurality of devices, M success devices and N failure devices, the M being an integer equal to or greater than one, the N being an integer equal to or greater than two, the N failure devices not including any of the M success devices, each of the M success devices being a device for which a change to the first setting information has succeeded, and each of the N failure devices being a device for which the change to the first setting information has failed;

in response to specifying the M success devices and the N failure devices, causing a display unit of the terminal device to display a first device screen including a plurality of device information respectively corresponding to the plurality of devices, the plurality of device information including M success device information corresponding to the M success devices and N failure device information corresponding to the N failure devices, wherein in the first device screen, each of the M success device information is displayed in an unselected form indicating that device information is not being selected, and each of the N failure device information is displayed in a selected form indicating that device information is being selected;

in response to accepting a first change instruction for changing a display form of each of N1 failure device information among the N failure device information from the selected form to the unselected form after the first device screen has been displayed, causing the display unit to display a first changed screen, wherein in the first changed screen, each of the N1 failure device information is displayed in the unselected form, and each of N2 failure device information other than the N1 failure device information among the N failure device information is displayed in the selected form, the N1 being an integer equal to or greater than one and less than the N, and the N2 being an integer which meets "N2=N−N1"; and in response to accepting a second sending instruction for instructing sending of second setting information under a situation where each of the N1 failure device information is displayed in the unselected form and each of the N2 failure device information is displayed in the selected form, sending the second setting information to N2 failure devices corresponding to the N2 failure device information as destinations, the second setting information being not sent to N1 failure devices corresponding to the N1 failure device information even if the second sending instruction has been accepted.

\* \* \* \* \*